(12) United States Patent
Crowe et al.

(10) Patent No.: US 9,879,609 B1
(45) Date of Patent: Jan. 30, 2018

(54) MULTI-COMPATIBLE DIGITAL ENGINE CONTROLLER

(71) Applicant: TUCSON EMBEDDED SYSTEMS, INC., Tucson, AZ (US)

(72) Inventors: David Crowe, Tucson, AZ (US); Elden Crom, Tucson, AZ (US)

(73) Assignees: Tucson Embedded Systems, Inc., Tucson, AZ (US); Turbine Powered Technology, LLC, Franklin, LA (US)

( * ) Notice: Subject to any disclaimer, the term of this patent is extended or adjusted under 35 U.S.C. 154(b) by 653 days.

(21) Appl. No.: 14/080,908

(22) Filed: Nov. 15, 2013

Related U.S. Application Data

(60) Provisional application No. 61/781,493, filed on Mar. 14, 2013.

(51) Int. Cl.
 *G06F 19/00* (2011.01)
 *F02C 9/00* (2006.01)

(52) U.S. Cl.
 CPC ..................... *F02C 9/00* (2013.01)

(58) Field of Classification Search
 CPC ........................................... F02C 9/00
 See application file for complete search history.

(56) References Cited

U.S. PATENT DOCUMENTS

| | | | |
|---|---|---|---|
| 4,308,463 A | 12/1981 | Giras et al. | |
| 4,671,576 A | 6/1987 | Fourie | |
| 4,693,077 A | 9/1987 | Skarvan et al. | |
| 5,006,993 A | 4/1991 | Vimig et al. | |
| 5,967,940 A | 10/1999 | Yamaguchi | |
| 6,289,274 B1 | 9/2001 | Martucci et al. | |
| 6,463,741 B1 | 10/2002 | Frutschi | |
| 6,480,744 B2 | 11/2002 | Ferek-Petric | |
| 6,516,612 B1 | 2/2003 | Yokoi et al. | |
| 8,131,384 B2 | 3/2012 | Karpman et al. | |
| 8,239,586 B2 | 8/2012 | Crom et al. | |
| 8,583,520 B1* | 11/2013 | Forbes, Jr. | G05D 17/00 340/870.02 |
| 8,850,876 B2 | 10/2014 | Ertz et al. | |
| 2002/0148438 A1 | 10/2002 | Ellims et al. | |
| 2003/0233637 A1 | 12/2003 | Martin | |
| 2004/0119293 A1 | 6/2004 | McKelvey et al. | |
| 2004/0267395 A1 | 12/2004 | Discenzo et al. | |
| 2008/0154823 A1 | 6/2008 | Volponi et al. | |

(Continued)

FOREIGN PATENT DOCUMENTS

JP   H09195919 A   7/1997

OTHER PUBLICATIONS

Zepeda, Richard, et al.; "Capability Driven Architecture: An Approach to Airworthy Reusable Software", American Helicopter Society 63rd Annual Forum, Virginia Beach, VA, May 1-3, 2007, 10 pp.

(Continued)

*Primary Examiner* — Adam M Alharbi
(74) *Attorney, Agent, or Firm* — Young Basile Hanlon & MacFarlane, P.C.

(57) ABSTRACT

A digital engine controller compatible with multiple variants of gas turbine engine is programmed to receive identification of a variant of gas turbine engine coupled to the digital controller and thereafter to automatically determine and adjust inputs to the engine, according to the received identification of engine variant, to meet user-specified output.

15 Claims, 16 Drawing Sheets

(56) References Cited

U.S. PATENT DOCUMENTS

| | | |
|---|---|---|
| 2008/0275597 A1 | 11/2008 | Gaulmin et al. |
| 2011/0030963 A1 | 2/2011 | Demong et al. |
| 2011/0064591 A1 | 3/2011 | McLoughlin et al. |
| 2013/0218437 A1 | 8/2013 | Gaffney et al. |
| 2015/0159563 A1* | 6/2015 | Soni .................. F02C 9/34 60/773 |
| 2015/0185716 A1* | 7/2015 | Wichmann ........... F01K 23/101 700/287 |
| 2015/0260557 A1* | 9/2015 | DeSilva .................. G01F 1/66 702/48 |
| 2015/0276548 A1* | 10/2015 | Holcomb ............. G01M 13/00 702/33 |
| 2015/0338312 A1* | 11/2015 | Ovando, II ........ G05B 23/0272 702/34 |

OTHER PUBLICATIONS

E. Ibragimov, "Use of Gas-Turbine Engines in Oil Field Pumping", Translated from Khimicheskaya i Neftyanoe Mashinostroenie, No. 11, Nov. 1994, pp. 24-26.

The Jet Frac Revolution, "Turbine Stimulation Technologies", www.bicmagazine.com, Apr. 2006, pp. 11-13.

D. Crowe, "Green Innovator of the Year", Tucson Embedded Systems, President & Co-founder, davidc@tucsonembedded.com, www.tucsonembedded.com; inception date 1997.(from archive.org date of Oct. 19, 2012 on www.gres.com).

Petek et al., "Performance Monitoring for Gas Turbines", ORBIT, vol. 25, No. 1, 2005, pp. 64-74.

\* cited by examiner

MULTI-COMPATIBLE DIGITAL ENGINE CONTROLLER

CROSS-REFERENCE TO RELATED APPLICATIONS

This application claims the benefit of the following earlier-filed U.S. Provisional Application in accordance 35 USC 119: Application No. 61/781,493, filed Mar. 14, 2013, entitled "METHODS AND SYSTEMS FOR DIGITALLY CONTROLLING TURBINE ENGINES." The entirety of the foregoing provisional application is hereby incorporated herein by reference.

BACKGROUND OF THE INVENTION

1. Field of the Invention

The present invention relates generally to software and hardware integration, and more particularly to the integration of independent software and hardware products in safety-critical, mission critical, or other regulated applications.

2. Description of the Related Art

The development of highly complex systems typically involves the use of multiple specialized vendors to design and manufacture specific, stand-alone components that are then integrated into the system. Unless an industry standard has been adopted, each stand-alone component is often developed using a proprietary and/or unique interface protocol. To integrate such components, customized interfaces must be developed, tested, and in certain applications, certified. The complexity of the integration effort is further increased where the same component needs to be integrated with multiple disparate platforms.

The complexity of integrating components into sophisticated systems can lead to the development of ad hoc architectures. Popularly called "stovepipes," such systems use point-to-point integration and can lack coordination and planning across multiple systems. Thus, prior integration efforts are often duplicated and the resulting system can suffer with a costly, unmaintainable, and unextendable architecture.

The impact of such systems is perhaps most strongly felt in areas of safety-critical or mission-critical development, such as avionics, defense, and medical, as well as applications requiring high reliability, determinism, robustness or continuous availability. The need to satisfy strict industry testing and certification regulations can turn the process of replacing or upgrading a mundane component into a substantial implementation-specific development effort, resulting in additional costs and time delays.

FIG. 1 depicts an example of the prior art process 100 of integrating components into complex systems, such as aircraft, ships, motorized vehicles, and even robots. Although FIG. 1 is described in terms of integrating physical peripherals, a person of ordinary skill in the art having the benefit of this disclosure will understand that the discussion is equally applicable to the integration of software. In the illustrated embodiment of FIG. 1, objects 108, 110, and 112 are depicted having capabilities which make it desirable that objects 108, 110, and 112 are interchangeable with systems 102, 104, and 106. Objects 108, 110, and 112 may be, by way of example and not limitation, a group of radios, radars, sensors, actuators, or other devices or software. Systems 102, 104, and 106 are depicted as aircraft having unique and differing implementations.

Generally speaking, an implementation is the successful actualization of a technical specification or algorithm as a program, software component, or other computer system. Various implementations may exist for a given specification or industry standard, many being unique and proprietary in nature. The framework allowing a given software application, including the control code of a physical periphery, to run is specifically described by a platform, which often includes a combination of the operating system (OS), programming languages and related runtime libraries, and user interfaces. The relationship between hardware components comprising a system and their individual properties is similarly described by the system's hardware and software architectures and focuses on managing and controlling dependencies. Thus, the integration of an object, either physical or virtual, having control code designed for one implementation into a system designed for another implementation involves the use of an interface having an architecture capable of managing the interactions between the object and system as well ensuring proper interpretation of commands.

Thus, for example, the integration of object 108 into systems 102, 104, and 106, can require the development of three separate interfaces, one for each system. Because the driving force of each integration effort is the characteristics of the given system, the architecture of each resulting interface can be fragile and limited in terms of reusability or adaptability. Therefore, although objects 110 and 112 are similar in terms of function, little of the development effort that went into creating the interfaces for object 108 can be reused or modified in integrating objects 110 and 112 with systems 102, 104, and 106. The ultimate result is the undertaking of nine duplicative, costly and time consuming, implementation-specific design efforts (illustrated by the connecting lines in FIG. 1) to integrate each object with each system. Where the systems are for use in safety-critical, mission-critical, or other regulated applications, each object-system implementation may further require verification and certification before release, with the extensive testing required further increasing costs and time delays.

Therefore, there is a need to develop an architecture allowing non-system and non-component specific integration of elements, where the architecture is verifiable, certifiable, and reusable within a given industry.

SUMMARY OF THE INVENTION

One aspect of this disclosure concerns a digital engine controller compatible with multiple variants of gas turbine engine. A digital engine controller compatible with multiple variants of gas turbine engine. The controller is programmed to receive identification of a variant of gas turbine engine coupled to the digital controller and thereafter to automatically determine and adjust inputs to the engine, according to the received identification of engine variant, to meet user-specified output.

Another aspect of the disclosure concerns a method of controlling a gas turbine engine. A standardized user interface is provided for use across multiple variants of gas turbine engine. The interface receives user input specifying a desired output of a subject gas turbine engine attached to the interface via an engine controller. The interface relays the user input to the engine controller. In response to receiving the user input, the engine controller manages operation of the subject gas turbine engine to achieve the desired engine output by utilizing stored rules and parameters and corresponding to the subject gas turbine engine.

DETAILED DESCRIPTION

Introduction

Figure 1:
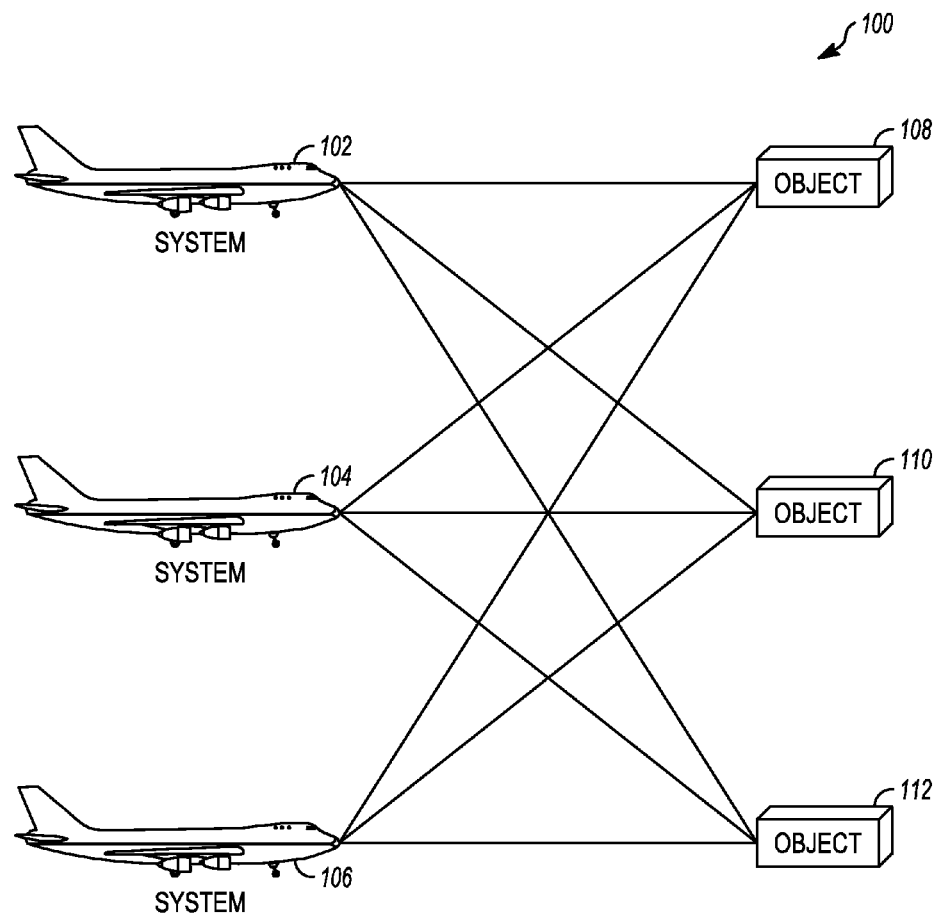
FIG. 1 illustrates an example of a prior art method of integrating components with implementation-specific systems.

One aspect of this disclosure considers the ability to replace or exchange components in complex systems. Further, an aspect of this disclosure considers the ability to replace or exchange such components in complex systems requiring significant testing or other means of approval before implementation. By way of example and not limitation, such applications include safety-critical, mission-critical, deterministic, high-reliability, robust, and continuous availability systems. Applicants' specifically disclose a method and apparatus for creating an interface architecture that is both non-implementation specific, i.e., system and component agnostic, and verifiable, certifiable, and reusable.

The current disclosure is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

The described features, structures, or characteristics of the disclosure may be combined in any suitable manner in one or more embodiments. In the following description, numerous specific details are recited to provide a thorough understanding of embodiments of the disclosure. One skilled in the relevant art will recognize, however, that the disclosure may be practiced without one or more of the specific details, or with other methods, components, materials, and so forth. In other instances, well-known structures, materials, or operations are not shown or described in detail to avoid obscuring aspects of the disclosure.

The schematic flow charts included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Integration of Multiple Objects into Complex Systems

Figure 2:
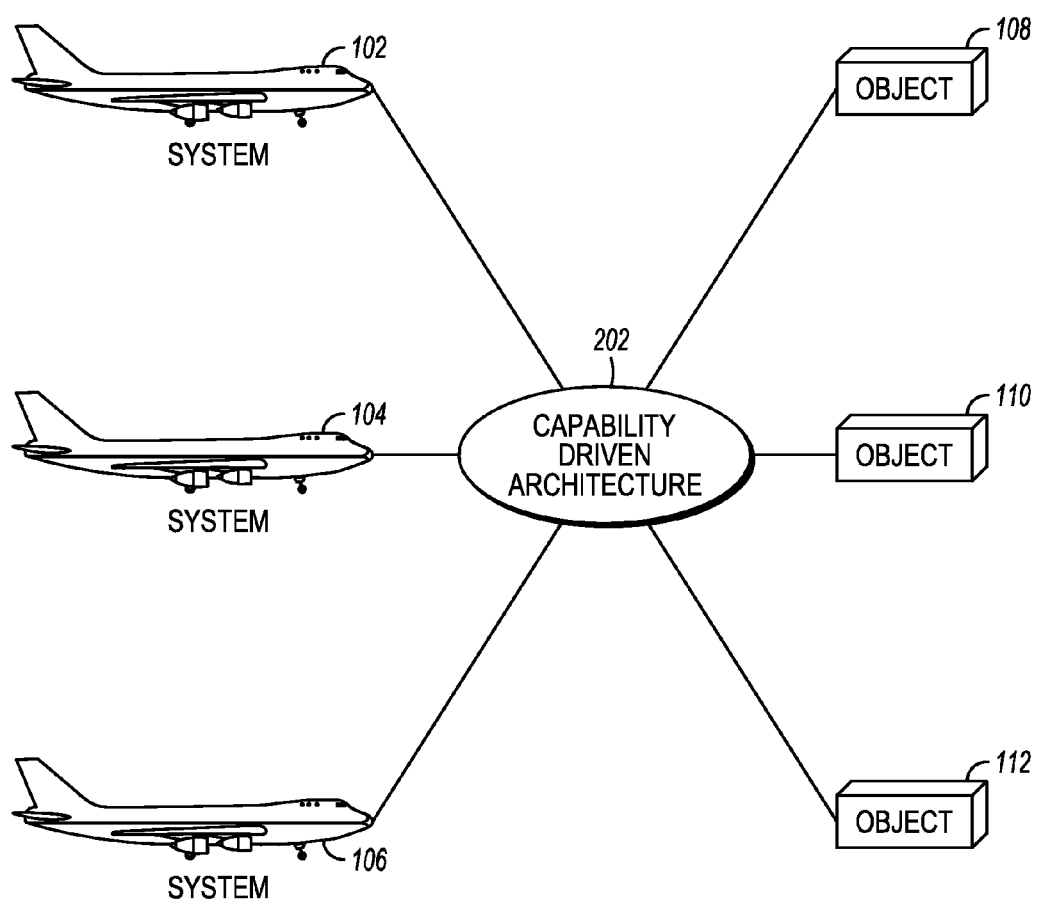
FIG. 2 illustrates an example of integration components according to one embodiment of the present disclosure.

Turning now to FIG. 2, an exemplary illustration of the integration of multiple objects into complex systems using Applicants' disclosure is presented. As described in regards to FIG. 1, objects 108, 110, 112 and systems 102, 104, and 106 are designed for different implementations. One aspect of Applicants' disclosure involves generating an interface 202 which is both implementation independent and usable with each object-system combination. Thus, the effort required to integrate and maintain each implementation and undergo any industry-specific certification or verification process is significantly reduced. Each object-system combination can utilize interface 202 with little to no additional development effort, facilitating the ease at which components can be changed. Furthermore, interface 202 itself may be verified and certified under an industry standard, minimizing or eliminating the need to undergo extensive and costly test development for each object-system combination through the reuse of certification artifacts. Applicants' process of generating interface 202 is subsequently discussed in greater detail.

As will be clear to one of ordinary skill in the art, by the term "object" Applicants refer to hardware, firmware, and software based components, or combinations thereof. Furthermore, in certain embodiments, the integration of software includes the integration of different operating systems (OSs) and input/output (I/O) routines.

Operational Sequence

Figure 5:
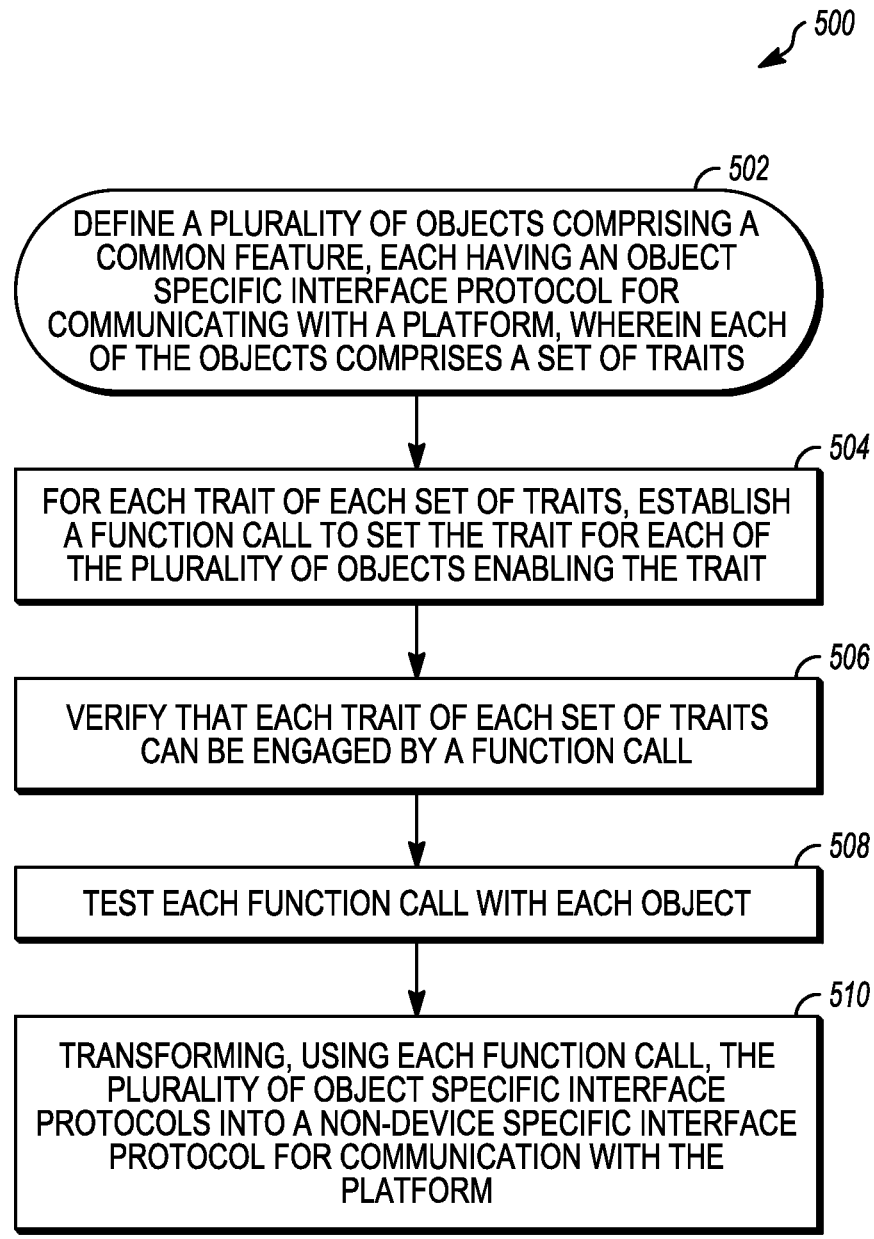
FIG. 5 illustrates a flowchart of an exemplary operational sequence according to one embodiment of the present disclosure.

Turning now to FIG. 5, a flowchart is presented depicting an exemplary embodiment of Applicants' disclosure. As indicated by block 502, a group of objects is defined for interfacing with the platform of a system, where each of the objects have a unique object specific interface protocol and set of traits. As used herein, a "trait" is a functionality, ability, characteristic, behavior, or other similar feature of an object, or combination thereof with which it is desirable for the system to engage via the present disclosure. In certain embodiments, a set of traits comprises all of the traits for a given object that can be engaged. In certain embodiments, a set of traits comprises a subset of all of the traits that can be engaged. In such embodiments, it may be desirable to prevent the system from engaging one or more traits of the object and therefore such traits are not included in the set of traits.

In certain embodiments, the group of objects is defined by the need to exchange the objects in and out of a particular system or class of systems. In certain embodiments, the group of objects is defined by the general function of the devices. In other embodiments, the group of objects may be defined by specifications provided by a manufacturer, end-user, or other entity. In certain embodiments, the group of objects is defined by a particular use of a system or group of systems.

In the illustrated embodiment of FIG. 5, for each trait of each set of traits, a function call is established, wherein the function call can set the trait for each of the objects enabling the trait, as indicated by block 504. In certain embodiments, establishing a function call includes modifying a previously established function call to set additional parameters. In such an embodiment, an established function call may set more than one parameter. In certain embodiments, establishing the function calls includes defining the control functions of each object. In such embodiments, identification of the control functions includes analyzing interface control documentation (ICD) for each object. Further, in such embodiments, each object may be manufactured by a different vendor, where the ICD for a given object is provided by the vendor. In certain embodiments, establishing the function calls includes defining the requirements and parameters of object-specific control functions. In certain embodiments, establishing the function calls includes abstracting object-specific control functions by mapping the data fields of different communication protocol to function parameters. In such an embodiment, the communication protocol may be for serial data buses, Ethernet, wireless, or any other interface, or combination thereof. In certain embodiments, the identification and abstraction of object-specific control code is automated. In certain embodiments, the establishment of function calls is automated.

Exemplary Architecture

Figure 3:
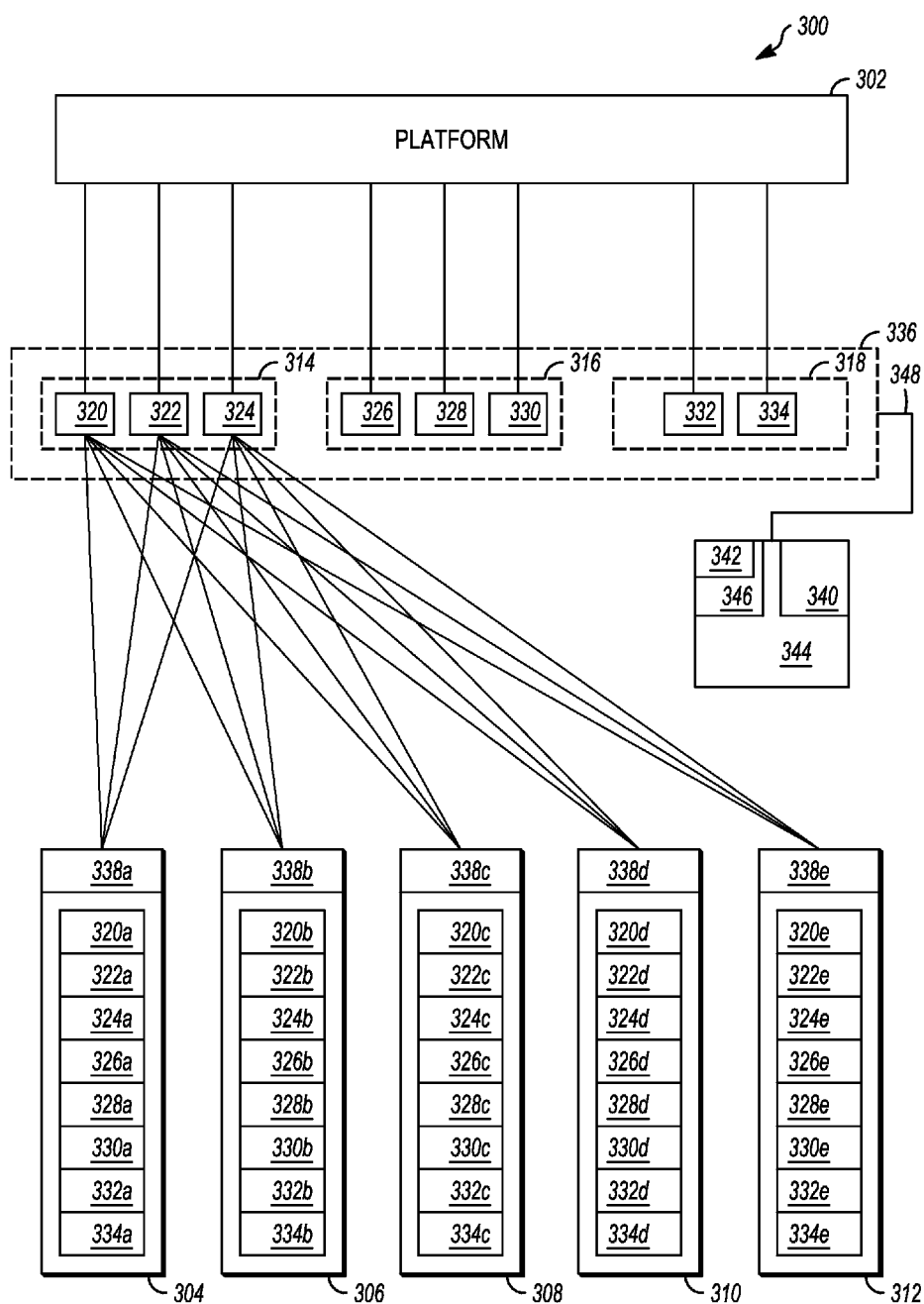
FIG. 3 illustrates a block diagram of an exemplary embodiment of an architecture for interfacing multiple objects having similar uses with a given system according to the present disclosure.

Turning now to FIG. 3, a block diagram is presented depicting an exemplary embodiment of an architecture 300 for integrating a defined group of objects with a given system. As depicted in the illustrated embodiment of FIG. 3, objects 304, 306, 308, 310, and 312 are depicted having traits 320a-334e. Furthermore, objects 304, 306, 308, 310, and 312 each have a proprietary and/or unique interface, 338a-e.

In the illustrated embodiment of FIG. 3, to aid in establishing the function calls, the traits have been sorted to capabilities, where each capability includes one or more related traits enabled by one or more of the objects. As will be understood by one of ordinary skill in the art, the process of sorting related traits into capabilities facilitates the identification of overlaps and similarities in the object-specific control code. In certain embodiments, capabilities are not needed or defined.

In the illustrated embodiment of FIG. 3, capabilities 314, 316, and 318 are depicted. Capability 314 includes traits 320a-e, 322a-e, and 324a-e, capability 316 includes traits 326a-e, 328a-e, and 330a-e, and capability 318 includes 332a-e and 334a-e. By way of example and not limitation, objects 304, 306, 308, 310, and 312 may be different navigation devices, sensors, communication devices or any other type of hardware or software component of a complex system. If by way of example objects 304, 306, 308, 310, and 312 are navigation devices, such as radios, traits 320a-330e may be, by way of example and not limitation, set power, set frequency, set volume, get frequency, set squelch, and get squelch, respectively. Thus, capability 314 may be defined to include those traits related to general radio functions, such as set power, set frequency, and get frequency, even though each of those traits are engaged in a unique and/or proprietary manner for each radio. Likewise, capability 316 may be defined to include those traits related to voice functionality, such as set volume, set squelch, and get squelch.

As stated, organizing the traits into groupings based on the function of the trait facilitates establishing function calls. In the illustrated embodiment of FIG. 3, function calls 320, 322, and 324 are established for the traits defining capability 314 (i.e., 320a-e, 322a-e, and 324a-e). Thus, function call 320, of capability 314, is capable of engaging trait 320a of object 304, 320b of object 306, 320c of object 308, 320d of object 310, and 320e of object 312. Likewise, function call 322, is capable of engaging trait 322a of object 304, 322b of object 306, 322c of object 308, 322d of object 310, and 322e of object 312 and function call 324, is capable of engaging trait 324a of object 304, 324b of object 306, 324c of object 308, 324d of object 310, and 324e of object 312. As will be understood by one of ordinary skill in the art, lines indicating function calls 326, 328, 330, 332, and 334 are capable of engaging the respective traits of objects 304, 306, 308, 310, and 312 have been omitted for clarity.

In certain embodiments, one or more function calls are the same as the object-specific control function for a given trait of a given object. In certain embodiments, one or more objects within the group of objects does not have one or more of the traits for which a function call is established.

In the illustrated embodiment of FIG. 3, function calls 320, 322, 324, 326, 328, 330, 332, and 334 are referred collectively as abstraction layer 336. Thus, platform 302 of a system communicates with abstraction layer 336 to implement a trait regardless of the specific object being controlled. By way of example and not limitation, for platform 302 to engage trait 326b of object 306, platform 302 uses function call 326, where function call 326 is capable of communicating with the object specific code of object 306. Likewise, to engage trait 326*d* of object 310, function call 326 is also used and is capable of communicating with the object specific code of object 310.

In certain embodiments, abstraction layer 336 is implemented using host computer 344. In certain embodiments, host computer 344 comprises one or more mainframe computers, one or more work stations, one or more personal computers, combinations thereof, and the like. In certain embodiments, host computer 344 comprises processor 340 and computer readable medium 346. In certain embodiments, instructions 342 are encoded in computer readable medium 346.

In such embodiments, information is transferred between host computer 344, platform 302 and/or objects 304, 306, 308, 310, and 312, via communication links, such as communication link 348. The communication links comprise an interconnection, such as an RS-232 cable or an RS-422 cable, an Ethernet interconnection, a SCSI interconnection, a Fibre Channel interconnection, an ESCON interconnection, a FICON interconnection, a Local Area Network (LAN), a private Wide Area Network (WAN), a public WAN, Storage Area Network (SAN), Transmission Control Protocol/Internet Protocol (TCP/IP), the Internet, combinations thereof, and the like.

As will be clear to one of ordinary skill in the art, by integrating the capabilities of the defined group of objects, via generalized function calls, rather the individual objects themselves, the resulting interface is independent of the specific object-system implementation. Thus, by way of example and not limitation, using such a capability driven interface according to the present discussion to integrate a complex system, such as a ship, with a group of functionally-similar objects, such as navigation devices, enables the replacement and/or exchange of the objects without further integration efforts. Wherein, by way of example and not limitation, the group of objects includes navigation device A and navigation device B, having been designed for implementation A and implementation B, respectively, to get the speed of a ship using navigation device A, the system accesses the function call for the "get speed" trait. When navigation device A is replaced with navigation device B, the system accesses the same function call; the use of the capability driven architecture thereby removing the need to develop specific object-system interfaces.

More Operational Details

In the illustrated embodiment of FIG. 5, the mapping of each trait to one of the function calls is then verified, as indicated by block 506. In certain embodiments, verification includes reviewing functional relationships and commonalities and identifying gaps and overlaps of the mapped function parameters. In certain embodiments, verification includes redefining capabilities. In certain embodiments, verification includes clarifying function calls. In certain embodiments, verification includes simplifying function calls. In certain embodiments, verification includes repeating the process indicated by block 504.

Next, as indicated by block 508, each function call is tested with each object, wherein the testing ensures that each function call can engage the appropriate trait of each object. In certain embodiments, such testing involves, where a function call fails to engage a trait of an object, repeating the processes indicated by blocks 504, and/or 506. In certain embodiments, the process of creating the function calls generates a test script. In such embodiments, the test script may be reusable with each object of the defined group of objects. In other such embodiments, the test script may be reusable when a new object is added to the defined group of objects. In certain embodiments, the test script conforms to industry-compliant software coding standards. In certain embodiments, the process of creating the function call generates documentation describing the requirements of the function calls. In such embodiments, the generated documentation may describe the scaling, values, format, or any other detail of the variables used by the function calls.

In the illustrated embodiment of FIG. 5, as indicated by block 510, the plurality of object specific interface protocols are then transformed, using the established function calls, into a non-object specific interface protocol for communication with the system. In certain embodiments, the object specific interface protocols are transformed into a non-object specific interface protocol by compiling the object code to create an executable. In certain embodiments, the object specific interface protocols are transformed into a non-object specific interface protocol by isolating the system from the objects via the function calls.

Exemplary Details of Architecture

Figure 4:
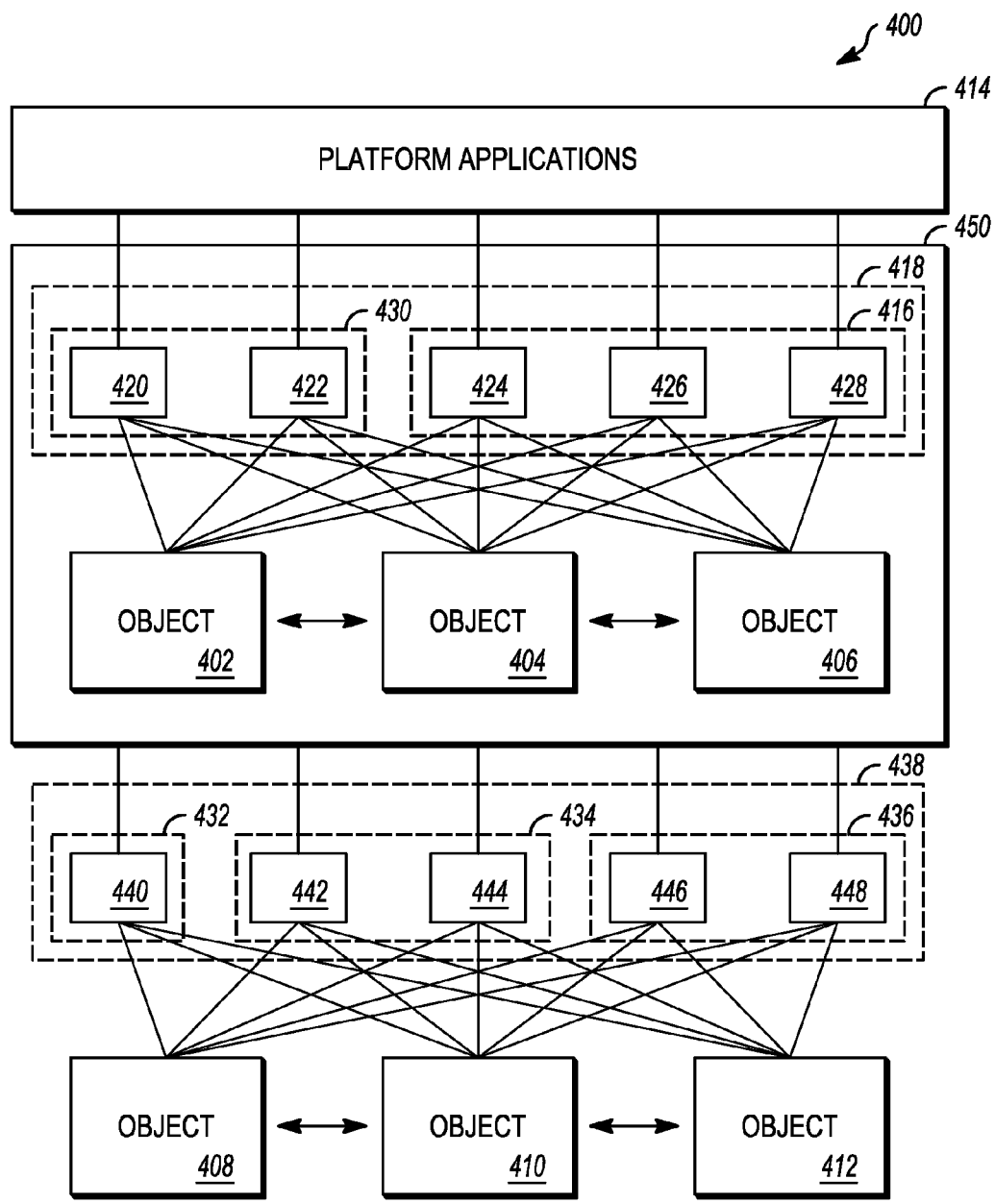
FIG. 4 illustrates a block diagram of an exemplary embodiment of a capability driven architecture according to the present disclosure.

Turning to FIG. 4, a block diagram is presented depicting an exemplary embodiment of a capability driven architecture 400 according to one aspect of Applicants' disclosure, wherein a plurality of object specific interface protocols for objects 402, 404, 406 408, 410, and 412 is transformed into a single generalized interface protocol.

In the illustrated embodiment of FIG. 4, objects 402, 404, and 406 may be different hardware components, such as by way of example and not limitation, radios, while objects 408, 410, and 412 are various system specific operating systems and system hardware combinations with which objects 402, 404, and 406 may be integrated. In the illustrative embodiment of FIG. 4, at the highest level is application layer 414.

Below application layer 414 is abstraction layer 418. Broadly speaking, abstraction layer 418 provides the interface between application layer 414 and the object-specific function calls of objects 402, 404, and 406. Abstraction layer 418 is depicted as including capabilities 430 and 416 having function calls 420, 422, 424, 426, and 428. The function calls 420, 422, 424, 426, and 428 are capable of communicating with the object specific function calls of objects 402, 404, and 406 to engage associated traits. As one, abstraction layer 418, capabilities 430 and 416, function calls 420, 422, 424, 426, and 428, and integrated object 402, 404, or 406 may be considered the object capability driven architecture 450 of architecture 400, wherein object capability driven architecture 450 is device independent. Thus, object capability driven architecture 450 can be used to integrate any group of defined objects, here objects 402, 404, and 406, with a given system.

To integrate objects 402, 404, and 406, with multiple systems having different operating environments, a second abstraction layer is used to isolate object capability driven architecture 450. In certain embodiments, the multiple systems comprise different types of systems within a given category of systems. By way of example and not limitation the different systems may all be aircraft and may include a helicopter, an airplane, and an unmanned aircraft. Alternatively, the different systems may all be ships and may include a cargo vessel, a submarine, and an aircraft carrier. In certain embodiments, the multiple systems comprise unrelated systems having the need to integrate the same defined group of objects. In such an embodiment the group of objects may be radios and the multiple systems may include a military jet, an aircraft carrier, and a High-Mobility Multipurpose Wheeled Vehicle (HMMVW). Alternatively, the group of objects may be navigation devices and the multiple systems may be an unmanned ground vehicle, an oil tanker, and an underwater research robot.

To create the second abstraction layer, here illustrated as abstraction layer 438, having capabilities 432, 434, and 436, and function calls 440, 442, 444, 446, and 448, the exemplary process illustrated in FIG. 5 is repeated, wherein objects 408, 410, and 412 are the system specific operating systems and system hardware combinations. In such an embodiment, capabilities 432, 434, and 436 may correspond to a single operating system service or related set of operating system services.

In certain embodiments, the exemplary process illustrated in FIG. 5 is iterative. In certain embodiments, certain combination of processes illustrated in FIG. 5 are iterative. In certain embodiments, individual processes described in connection with FIG. 5 may be combined, eliminated, or reordered.

In certain embodiments, instructions, such as instructions 342 (FIG. 3) are encoded in computer readable medium, such as computer readable medium 346 (FIG. 3) wherein those instructions are executed by a processor, such as processor 340 (FIG. 3) to perform one or more of the blocks 502, 504, 506, 508, and/or 510, recited in FIG. 5.

In yet other embodiments, the disclosure includes instructions residing in any other computer program product, where those instructions are executed by a computer external to, or internal to, a computing device to perform one or more of the blocks 502, 504, 506, 508, and/or 510 recited in FIG. 5. In either case the instructions may be encoded in a computer readable medium comprising, for example, a magnetic information storage medium, an optical information storage medium, an electronic information storage medium, and the like. "Electronic storage media," may mean, for example and without limitation, one or more devices, such as and without limitation, a PROM, EPROM, EEPROM, Flash PROM, CompactFlash, SmartMedia, and the like.

Implementation Example #1: Radios

The following example is presented to further illustrate to persons skilled in the art how to make and use one embodiments of this disclosure. This example is not intended as a limitation, however, upon the scope of the invention, which is defined only by the appended claims.

By way of example and not limitation, it may be desirable to exchange one radio with another in an aircraft without developing separate radio-specific control interfaces. Specifically, it may be determined that three military radios, RADIO A produced by Company A, RADIO B produced by Company B, and RADIO C produced by Company C, need to be interchangeable with one another without having to alter the interface between the currently installed radio and the aircraft.

Once the group of radios to be integrated is defined, the ICDs for the radios are examined. While it is not necessary for all the ICDs for each radio in the group be used, it will be understood by one of ordinary skill in the art, that the more ICDs that are analyzed, the more assurance that the resulting interface will be broad enough to communicate with each of the radios in the group. Furthermore, it will be understood by one of ordinary skill in the art that additional ICDs, for radios not currently being integrated, can also be analyzed to increase the breadth of the resulting interface. Thus, the use of additional ICDs decreases, or even eliminates, the need for additional development and/or testing if an new radio is added to the defined group of radios, here RADIO A, RADIO B, and RADIO C.

The ICDs are analyzed to determine what functionalities are common between the radios. By way of example and not limitation, all three military radios are able to act as normal, line-of-site radios without frequency hopping or encryption. Furthermore, RADIO B and RADIO C are capable of satellite communication (SATCOM). The related functions of the radios would be grouped into capabilities for ease and to facilitate further analysis. In the present example, the functions to set the transmitting frequency, set the receiving frequency, and to receive the transmitting frequency on all three radios may be assigned to the capability "Radio." Similarly, the function to set the satellite channel for RADIO B and RADIO C may be assigned to the capability "SATCOM."

While the radios used in the present example have more functions, which can be organized into more capabilities, than what is presently described, a person of ordinary skill having the benefit of this disclosure will understand that for clarity only the four functions mentioned within the Radio and SATCOM capabilities will be described in the following example. However, a person of ordinary skill in the art having the benefit of this disclosure will further understand the application of the present discussion to the complete range of functions of each radio.

Taking the Radio capability first, the parameters for setting the transmitting frequency, setting the receiving frequency, and receiving the transmitting frequency are determined, as well as the size and scaling of each parameter. In the present example, RADIO A can transmit and receive frequencies between 25 MHz to 425.325 MHz and can be set in 25 kHz increments and RADIO B can transmit and receive frequencies between 25 MHz to 150.695 MHz in 5 kHz increments. RADIO C can transmit and receive frequencies between 25 MHz to 150.695 MHz in 5 kHz increments, between 175 MHZ to 210.375 MHz in 25 kHz increments, and between 215 MHz to 425.325 MHz in 5 kHz increments.

In analyzing these parameters, it may be determined that a variable type of an unsigned integer of 32 bits (uint32) at 1 Hz per unit will be able to produce the full range of frequencies possible on each of the three radios. As will be known to one of ordinary skill in the art, uint32 allows values between 1 and 4,294,967,296. Thus, by setting each unit to 1 Hz, the variables of uint32 can represent any value between 1 Hz and 4.294967296 GHz.

A person of ordinary skill in the art having the benefit of this disclosure will understand that other variable types and values may be used in the present example. By way of example and not limitation, each unit could equal 5 kHz, as 5 kHz Is the smallest increment of any of the three radios over their full range of frequencies. However, it would be understood that while 5 kHz can be used for the value of each unit, this may not be optimal for future integration of additional radios, which may have 1 kHz increments. Furthermore, by using the uint32 variable at 1 Hz per unit, the resulting interface will have the ability to represent a value roughly ten times larger than the highest frequency of any of the three radios. In looking forward to what additional radios may be integrated in the future, this value appears to be sufficiently large. Finally, by using 1 Hz per unit, rather than for example 5 kHz, the resulting function call will be simplified as no additional multiplication will be needed to determine the value to set the variable to.

Where using 1 Hz per unit results in the variable not being equal to an acceptable setting for a radio, given the radio's incremental settings, the ensuing function call may be created such that the variable is rounded to the closest acceptable value. Therefore, if, for example, the aircraft attempts to set the transmission frequency of RADIO B, to 32.787 MHz, a 2,787 kHz increase if RADIO B was originally at 30 MHz, the value is rounded to 32.785 MHz, the closest value RADIO B is capable of, when the generalized function call engages the object specific function calls for RADIO B.

Additionally, to establish a generalized function call, the device specific message format for each radio must be understood. In RADIO A the numeric value of the frequency is encoded in the first 16 bits of the first word of a message, wherein a word is represented by 4 bytes (32 bits). Specifically, the value is represented in megahertz by Binary Coded Decimal (BCD) and therefore each digit of the value is represented by a binary sequence. Of the first word, bits 0-3 represent tens, bits 4-7 represent ones, bits 8-13 represent tenths, and bits 12-15 represent hundreds. Additionally, RADIO A allows an offset to the encoded frequency, represented by bits 0 and 4-6 of the second word of the message, where bit 0 represents whether the offset is added or subtracted from the encoded frequency.

Similar to RADIO A, with RADIO B the value of the frequency, in megahertz, is represented in BCD. However, with RADIO B, it is the second word that represents the frequency. Specifically, of the second word, bits 0-3 represent tens, bits 4-7 represent ones, bits 8-13 represent tenths, and bits 12-15 represent hundreds. Also, RADIO B allows an offset to the encoded frequency, represented by bits 10-15 of the first word of the message, where bit 10 represents whether the offset is added or subtracted from the encoded frequency.

Finally, for RADIO C, the first word is used for the transmitting frequency while the second word is used for the receiving frequency. The value of the frequency, in megahertz, is multiplied by 1000 and converted to a 32 bit number.

Turning to the SATCOM capability, the industry-adopted SATCOM standard allows for, at most, 255 channels and defines the transmitting and receiving frequencies. Thus, the range of the SATCOM capability for RADIO B and RADIO C is the same, though, as with the Radio capability, the message format differs. For RADIO B, the satellite channel is set by the first word of a message. For RADIO C the satellite channel is set by bytes 1 and 2 of the third word.

Once the size, scaling, and or requirements of the parameters for each of the functions have been determined, the range of variation between the radios is known and function calls can be established. To set the transmitting frequency, a function call is written to accept a value for the frequency setting from the aircraft that handles all the variation between the devices by using a uint32 variable of 1 Hz per unit. This would be the same for the set receiving frequency and get transmitting frequency functions. The function call would be written such that, if RADIO A is being used the frequency is represented by bits 0-15 of the first word and 0, 4-6 of the second word of a message whereas it is represented by bits 0-15 of the second word for RADIO B (wherein an offset is represented by bits 10-15 of the first word) and word 1 or 2 for RADIO C depending on whether it is a transmitting or receiving frequency. Likewise, for the set satellite channel function, a function call would be written that, if RADIO B is used, sets bits 8-15 of the first word, and if RADIO C is used, bytes 1 and 2 of the third word are set.

As will be appreciated by one of ordinary skill in the art, the resulting interface may be informed of which radio the system is presently in communication with a number of ways. In certain embodiments, the system may provide a flag or other indicator of the specific radio. In certain embodiments, the system may be queried to determine which radio is in use. In certain embodiments, the radio itself may be queried. In yet other embodiments, which radio is in use is determined from messages being received from the radio.

As will be understood by one of ordinary skill in the art, for certain applications, various industry or application specific requirements may need to be considered in addition to the size, scaling, and or requirements of the parameters. This may include, but is not limited to, safety critical requirements for interface protocols or specific formatting required for certification under a given standard.

The parameters of each object specific function of each radio is then reviewed to ensure that the parameter has been mapped to a variable of an established function call and are tested with each object. The function calls have then transformed the multiple object specific interface protocols into an implementation independent interface protocol.

Implementation Example #2: Gas Turbine Engine Control with (Optional) Multi-Compatibility As another example, the architecture of FIGS. 3-4 may be applied to the task of digitally controlling one or more engines. Although this is applicable to any engine, this example is discussed in the context of a gas turbine engine such as the engine 600 of FIG. 6. This engine 600 includes an N2 rotating system 602, a combustion stage 604, a compressor stage 606, speed/torque sensor 608, and N2 output power 610. A controller, which in this example uses the capability driven architecture described herein above, is embodied by item 616. The controller receives data from the engine 600 via at least one feedback line 612, and sends control signals to the engine 600 on at least one control line 614. The controller 616 may be implemented in different ways, with one example being an integration of FPGA circuit, microprocessor, memory, and various I/O lines, using a custom operating system and various unique device drivers.

Referring additionally to FIG. 3, to provide built-in compatibility with multiple engines, an optional feature includes configuration of the architecture 300 such that each of the objects 304-312 represents a different variant (such as make/model) of engine. One or more of the objects 304-312 may additionally comprise an interface such as a display monitor and associated GUI.

For the set of traits corresponding to a given engine, such as traits 320a-334a, the traits may comprise numbers, equations, ranges, lookup tables, sequences, or other formulations of data or relationships pertinent to that engine. Some exemplary traits relevant to gas turbine engines include the following: N1 max, N2 max, EGT max, EGT max at a given time, oil pressure limits, blend band control parameters, operational ranges, and anti-icing details expressing capability of engine bleed air. The gas turbine engine traits may also include one or more proportional-integral-differential (PID) control loops.

For the set of function calls appropriate to turbine engines, some examples include manual or automatic commands such as "come to idle," startup (bring engine online and up to idle), speed up, speed down, set N1 value, set N2 value, engine ON, engine OFF, purge, emergency stop, initiate natural gas test sequence, initiate diesel valve test sequence, initiate fault reporting, initiate self-diagnostics, initiate prognostics, conduct data reporting, query job status, set fuel injection rate, etc.

Figure 7:
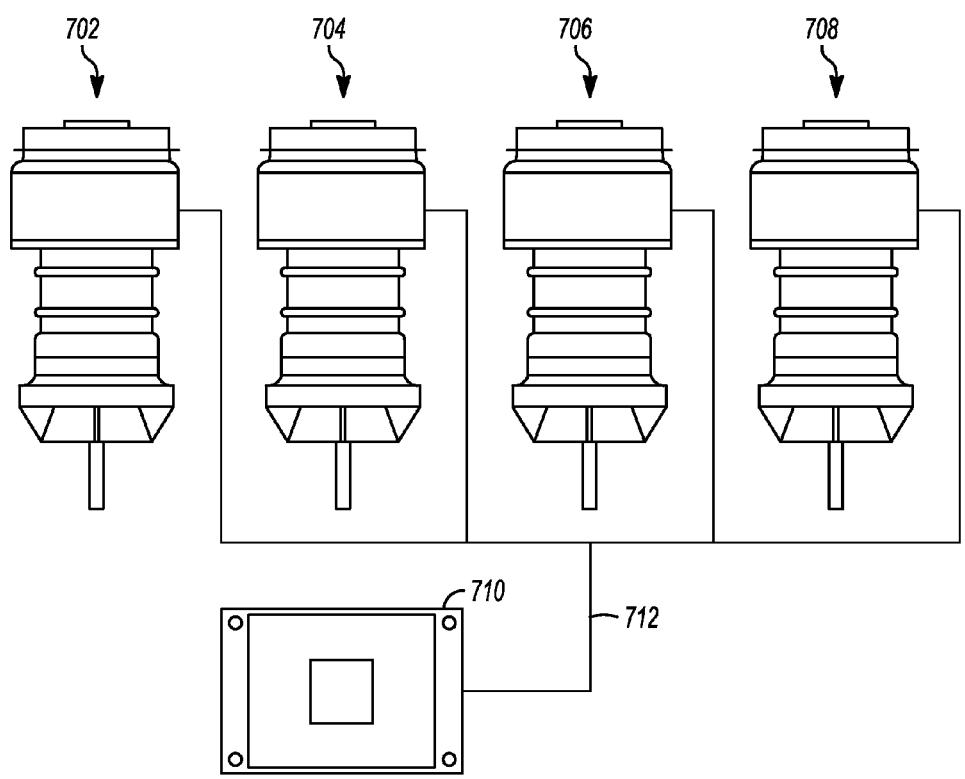
FIG. 7 is a block diagram of an exemplary application of multi-compatible engine controller according to one embodiment of the present disclosure.

FIG. 7 illustrates one embodiment where the controller is "multi-compatible" as explained below. Here, control lines 712 couple multi-compatible controller 710 to one of multiple engine variants 702-708. There are four possible engine variants 702-708 in this example, although a greater or lesser number if compatible engines is contemplated.

Figure 12:
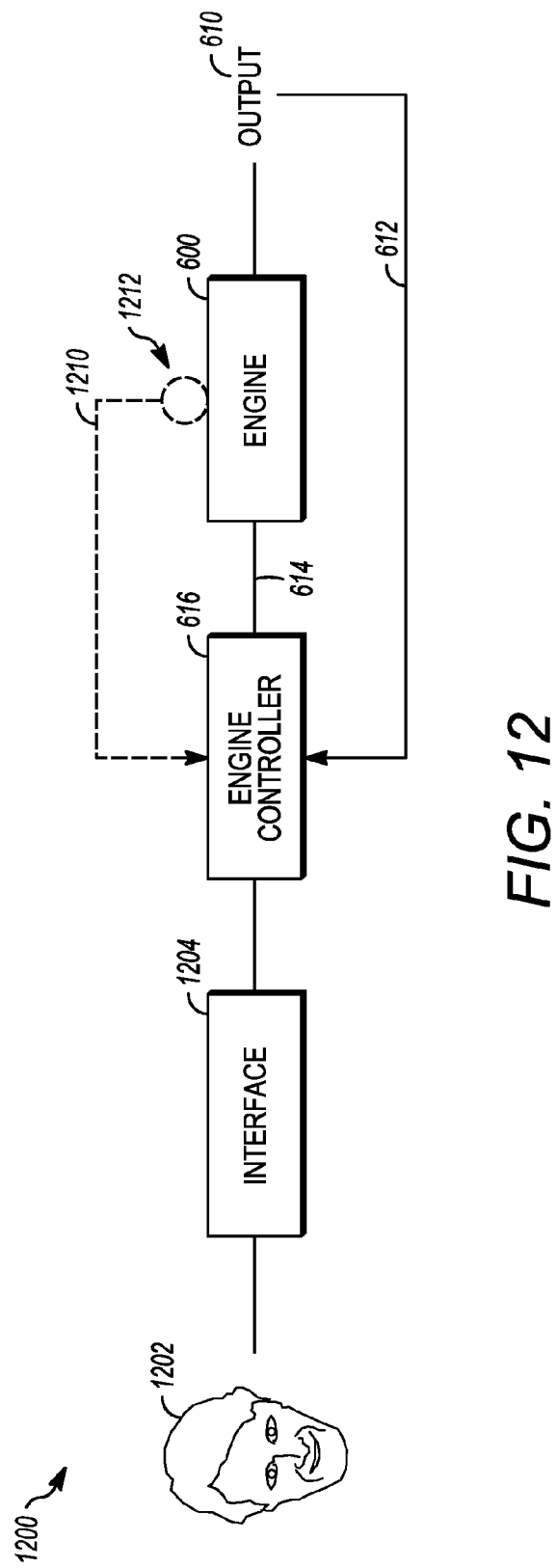
FIG. 12 is a block diagram of an exemplary application of digital engine controller according to one embodiment of the present disclosure.

FIG. 12 even further illustrates the present example. FIG. 12 shows the engine controller 616 coupled to the engine 600, which provides an output 610. As shown, the engine controller 616 is coupled to various controls (not shown) of the engine 616 via control links 614.

Figure 6:
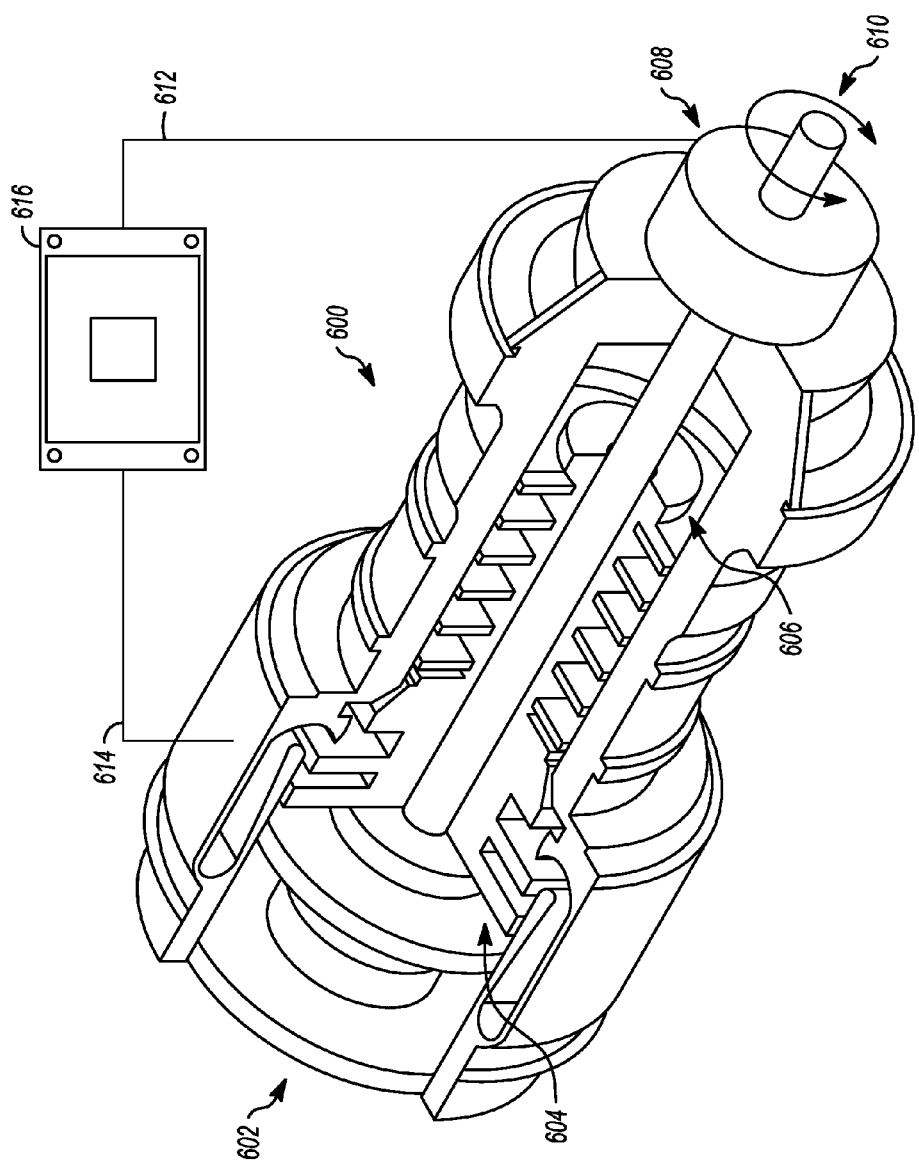
FIG. 6 is a block diagram of an exemplary application of an engine controller according to one embodiment of the present disclosure.

In one example, the engine controller 616 is embodied by the architecture 300, and the engine 600 is the gas turbine engine from FIG. 6. A user 1202 interacts with the engine controller 616 by way of an interface 1204.

The controller 616 is also coupled to a variety of sensors (not shown) associated with the engine and providing data describing engine operating characteristics, such as N1, N2, exhaust gas temperature, oil pressure, oil temperature, diesel manifold pressure, P3 pressure, natural gas pressure, diesel flow feedback, NG flow feedback, battery voltage, oil filter delta pressure, oil level indicator, oil chip detect, and more. As for engine controls relayed via 614, these are exemplified by the traits and function calls explained above in detail. Optionally, where the controller 616 uses stored rules and parameters including at least one PID control loop for each engine variant, the controller 616 may be programmed to modify any of the PID control loops as commanded by the user 1202 via the interface 1204.

Figure 14:
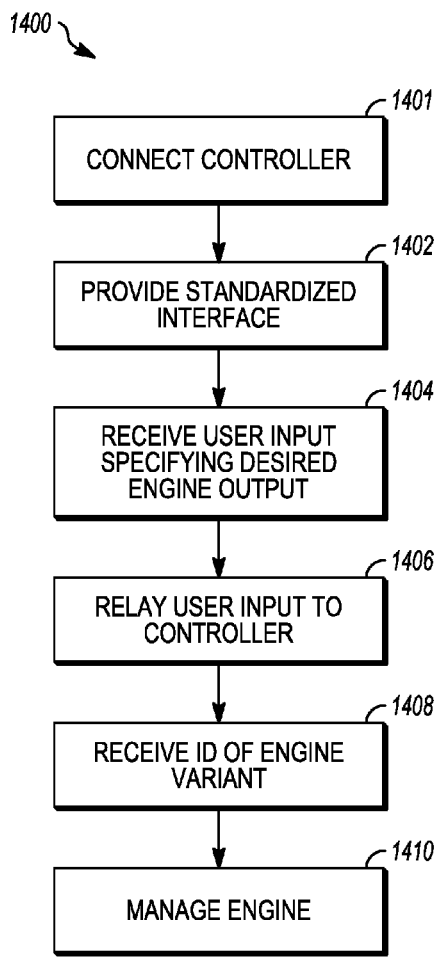
FIGS. 14-16 are exemplary sequences for operating a controller according to embodiments of the present disclosure.

FIG. 14 shows an exemplary operating sequence 1400 for controlling an engine such as a gas turbine engine. Computational steps of the sequence 1400 may be embodied directly in hardware, firmware, circuitry, software executed by hardware, or a combination of these. Although the steps 1400 are necessarily depicted in some order, the order may be changed, steps combined, and other changes to the sequence without departing from the scope of this disclosure.

For ease of explanation, but without any intended limitation, the example of FIG. 14 is described in the specific context of the system hardware from FIG. 12. Step 1401 couples the controller 616 to controls and sensors of the target engine 600. Numerous examples of these controls and sensors were given above. This step may be performed manually by a technician, for example.

Step 1402 provides the interface 1204, such as a display screen or electronic or steam gauges, dials, numerical readouts, or any other device appropriate to provide the appropriate type of visual feedback for this application. In one example, the interface 1204 is standardized, in that the display features or input/outputs of the interface are substantially the same regardless of the make, model, or other variant of gas turbine engine being controlled. For example, the same interface 1204 may be used for the Lycoming T55 and the Allison T40 engines. In one example, the interface is further standardized so that the user inputs are limited to commands to turn the engine 600 on, turn off, and set speed of engine output 610.

In step 1404, the interface 1204 receives input from the user 1202 specifying a desired engine output 610. As an example, the specified engine output 610 may include speed, torque, N2 output, or other representation of engine output. Advantageously, the user input may be free of any specificity as to which variant of gas turbine engine is represented by the engine 600, and free of any control inputs to be supplied directly to the engine. And, in this sense, the interface 1204 and controller 616 present to the user 1202 as a black box, reducing demands on the user 1202 and also reducing the potential for error.

In step 1406, the interface 1204 relays the desired engine output to the controller 616. In step 1408, the engine controller 616 receives some identification of the particular variant of gas turbine engine represented by the engine 600. This may be contained in digital storage accessible by or on-board the controller 616, received via input from the user 1202, pre-programmed into the controller 616, retrieved from storage on-board the engine 600, ascertained by interrogating the engine 600, or other means.

In response to the user input from step 1406, and according to the engine variant identified in step 1408, the controller 616 in step 1410 manages operation of the engine 600. More particularly, the controller 616 calculates engine control inputs compatible with the variant identification received in step 1408, and applies the calculated engine control inputs to the gas turbine engine 600 to produce the user-specified engine output from step 1404. In other words, the controller 616 manages operation of the subject gas turbine engine to achieve the desired engine output by utilizing stored rules and parameters corresponding to the subject gas turbine engine. These rules and parameters may be expressed, for example, in terms of the traits, function calls, or other applicable features of the architecture 300. As a more particular example, one or more PID control loops stored in the traits 320a-334a may be used to regulate engine output.

In an example of one PID loop, the loop receives inputs including user-specified shaft horsepower or other engine output, as well as sensed engine conditions such as temperature, speed, and torque. The output of this loop includes air, fuel, ignition, and/or other parameters to be used as combustion inputs to the engine.

Implementation Example #3: Gas Turbine Engine Control with Auto Detect

A further exemplary application of the present disclosure involves an engine controller with an engine auto detect feature. Although this is applicable to any engine, this example is discussed in the context of gas turbine engines as described above in FIGS. 6, 7, and 12.

In contrast with the previous example, this scenario includes a data source 1212 (FIG. 12) physically attached to, or otherwise associated with, the engine 600. The data source 1212 is referred to as a "bullet" herein. Broadly, the bullet 1212 identifies the variant, such as make/model, of the engine 600 to the controller 616. The bullet 1212 and engine controller 616 communicate via a path 1210. The bullet 212 may also serve to store further data in support of the controller 616's functions, as explained below.

The bullet may be a passive storage device, a continually active transmitter or broadcaster of data, or a data transmitter that only acts in response to interrogation by the controller 616. Some examples include circuit storage, a microcontroller with integrated electronic storage, magnetic or optical machine readable storage, a radio frequency identifier, an optically transmitting or reflecting tag, a linear or matrix or other bar code, or a radio or other frequency beacon. Accordingly, the path 1210 may comprise one or more cables, wires, circuit traces, optical links, electromagnetic links, line of sight, or other applicable wired or wireless link. To cite an even more specific example, the path 1210 may be implemented as an SPI bus, or as a wireless link using the Zigby wireless communications protocol.

The bullet 1212 is physically associated with the target gas turbine engine by physical attachment to the engine 616, integration into an engine component, or by physical attachment to a frame, skid, housing, or other structure attached to or containing the engine 616. In one example, the bullet 1212 is associated with the target gas turbine engine by physically proximity to the engine 600.

In one example, the bullet 1212 stores a code, symbol, or other signal identifying the variant, such as make/model, of engine represented by the engine 600. For example, the bullet may store a digital representation of the engine serial number and/or engine type. The bullet 1212 may further store data in support of the controller 616's functions, such as some or all of the traits 320*a*-334*e*, function calls 320-334, and/or other applicable component of the architecture 300. In this case, the bullet 1212 stores rules, parameters, and communication syntax compatible with the installed gas turbine engine 600.

The foregoing feature further aids the multi-engine compatibility of the controller 616, since the controller 616 does not need to be reprogrammed to achieve compatibility with new engine types. Instead, the necessary function calls, traits, parameters, operating conditions, syntax, and/or other data is stored on board the bullet 1212.

Figure 11:
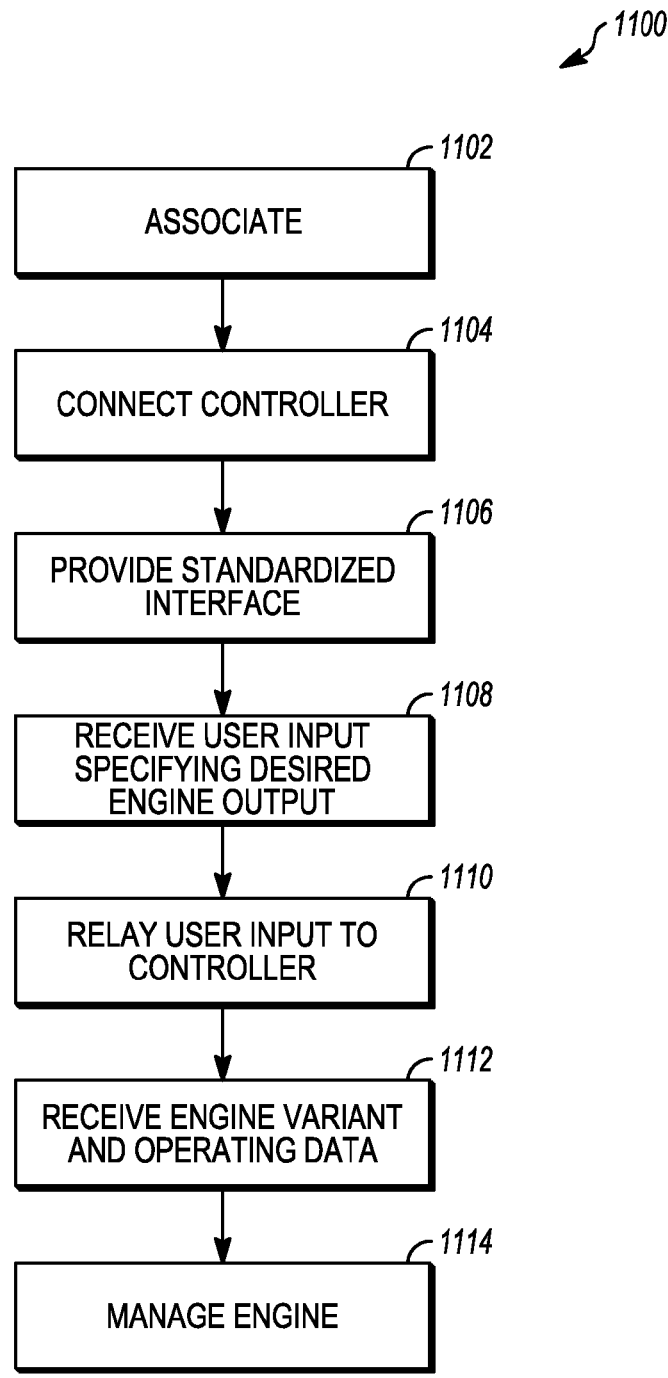
FIG. 11 is an exemplary sequence for operating a digital engine controller according to one embodiment of the present disclosure.

FIG. 11 shows an exemplary operating sequence 1100 for controlling an engine such as a gas turbine engine, using the auto detect feature described above. Computational steps of the sequence 1100 may be embodied directly in hardware, firmware, software executed by hardware, circuitry, or a combination of these. Although the steps 1100 are necessarily depicted in some order, the order may be changed, steps combined, and other changes to the sequence without departing from the scope of this disclosure.

For ease of explanation, but without any intended limitation, the example of FIG. 11 is described in the specific context of the system hardware from FIG. 12. In step 1102, the bullet 1212 is associated with the engine 600. This step may be performed manually by a technician, or automatically during manufacture of the engine 600. Many exemplary strategies for associating the bullet 1212 with the engine 600 were given above. In step 1104, the controller 616 is coupled to controls and sensors of the target engine 600. Numerous examples of these controls and sensors have been given above. This step may be performed manually by a technician, for example.

Step 1106 provides the interface 1204, which may be carried out in the same manner as step 1402 of FIG. 14, discussed above. In step 1108, the interface 1204 receives input from the user 1202 specifying a desired engine output 610, the details of which may be the same as step 1404 discussed above. In step 1110, the interface relays the received user input to the controller 616.

In step 1112, the controller 616 receives data from the bullet 1212. This may involve passively receiving such data, for example if the bullet 1212 is configured to automatically broadcast or otherwise transmit a signal. Or, the controller 616 may query the bullet 1212, such as by retrieving data from circuit storage, activating an electromagnetic field to query a RFID tag, illuminating a bar code or reflector, etc.

In one example, data from the bullet 1212 identifies the variant of the target gas turbine engine 600. As mentioned above, data from the bullet 1212 may further support the functions of the controller 616 and avoid the need to store engine-specific data in the architecture 300 by storing information such as some or all of the traits 320*a*-334*e*, functions 320-334, PID control loop(s), or other rules, parameters, and communication syntax specifically compatible with the installed gas turbine engine 600. In a different example, the controller 616 receives identification of the engine variant from the user 1202 via the interface 1204, while receiving operating data specific to the engine from the bullet 1212. As a further enhancement, the controller 616 may optionally cache, or permanently store, operating data received from the bullet 1212 in storage local to the controller 616 in order to speed operations of the controller 616.

In any case, it may be the case that prior to the controller 616 receiving operating data specific from the bullet 1212, the controller was not programmed to manage the particular variant of installed gas turbine engine, and only achieves such programming by receive of data from the bullet 1212.

In step 1114, responsive to receiving the data from the bullet 1212 in step 1112, the controller 616 interactively manages operation of the target gas turbine engine 600 using rules, parameters, and communication syntax particularly designed for the variant of the installed gas turbine engine 600. These may be stored in the architecture 300 and/or aboard the bullet 1212, as discussed hereinabove in detail. More particularly, the controller 616 calculates engine control inputs according to the engine variant and operating data received in step 1112, and applies the calculated engine control inputs to the gas turbine engine 600 to produce the engine output that was specified by the user in step 1108. In other words, the controller 616 in step 1114 manages operation of the gas turbine engine 600 to achieve the desired engine output by utilizing stored rules and parameters corresponding to the subject gas turbine engine. These rules and parameters may be expressed, for example, in terms of the traits, function calls, or other applicable features as found in architecture 300 or retrieved from the bullet 1212. As a more particular example, one or more PID control loops stored in the traits 320*a*-334*a* may be used to regulate engine output. The use of an exemplary PID control loop was discussed above.

Implementation Example #4: Pump-Engine Assembly

In a further example, the architecture of FIGS. 3-4 may be applied to the task of digitally controlling a pump-engine assembly, and namely, a gas turbine engine and a pump, where the engine drives the pump. Here, a pump-engine controller automatically determines and adjusts inputs to the pump to regulate hydraulic output of the pump to meet user-specified output characteristics despite changing loads on the pump. The pump may be used for various applications, with one example being injecting fluids and/or semi-fluids into the ground during hydraulic fracturing operations. Some other applications of the pump include high volume water pumping in pipelines or waterborne firefighting, industrial fluid mixing, or any other high volume fluid or semi fluid application.

Figure 8:
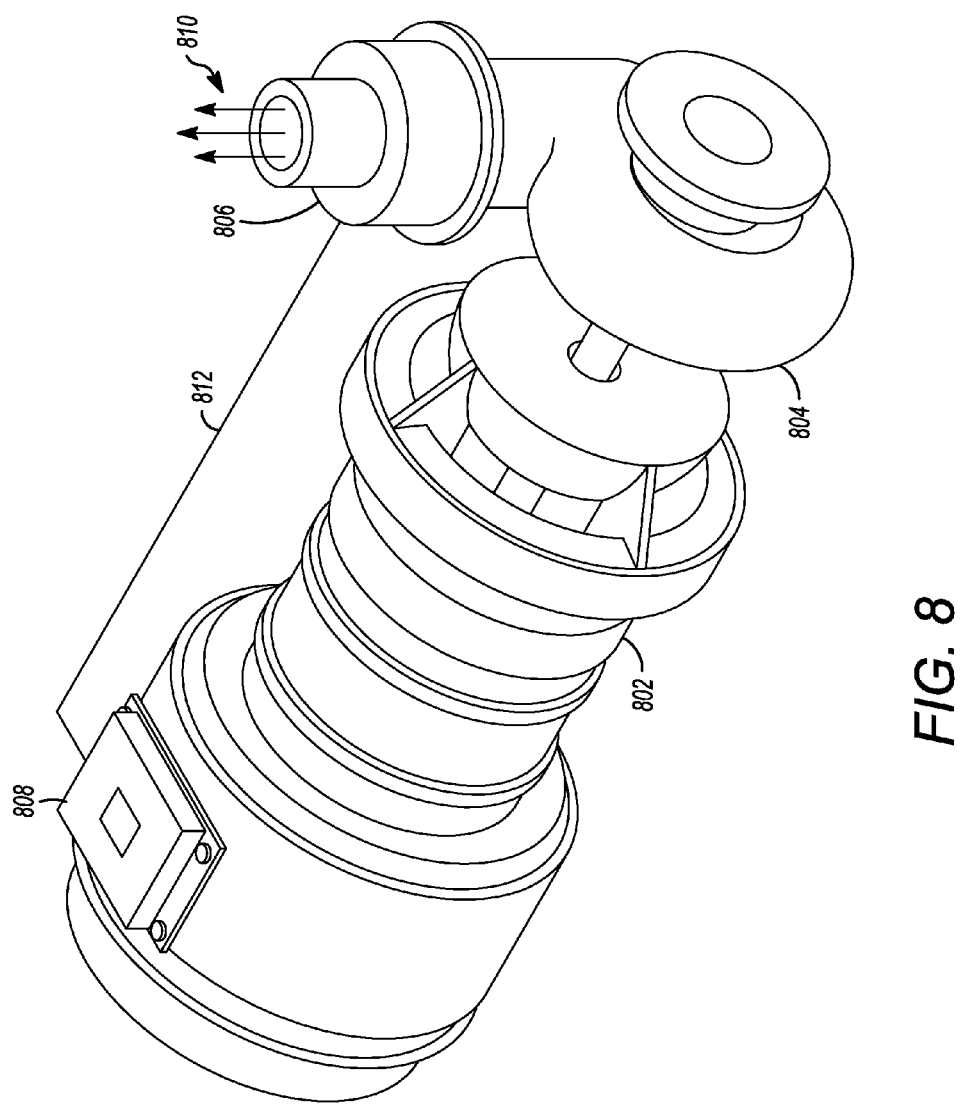
FIG. 8 is a block diagram of an exemplary application of pump-engine controller according to one embodiment of the present disclosure.

Although these teachings may be applied to various engines, this example is discussed in the context of a gas turbine engine such as the engine 802 of FIG. 8. The system of FIG. 8 includes an engine 802 configured to drive pump 804. A system controller 808 manages the operation of the engine 802 by way of control lines (not shown). The pump 804 produces a hydraulic output 810, which in one example includes output pressure and flow. The system controller 808 is coupled to a sensor 806 by way of a feedback line 812, the sensor measuring pressure and/or flow at the output 810.

The system controller 808 is programmed such that the operation of automatically regulating flow and pressure at the pump 804 comprises calculating operational input requirements of the gas turbine engine 802 to meet the prescribed flow characteristics at the output 810, and transmitting the calculated input requirements to the engine 802. The system controller 808 therefore oversees the operation of the pump/engine combination, and also the engine. The controller 808 may be implemented by one or multiple controllers.

Optionally, the system controller 808 may provide multi-compatible engine functionality, and namely, built-in compatibility with multiple different engine variants. In this case, the system controller employs architecture 300, which is configured such that each the objects 304-312 include different engine variants, such as engine make/models. One or more of the objects 304-312 may additionally comprise a display such as a monitor and associated GUI. Further, one or more of the objects 304-312 may additionally represent pumps, in order to provide the controller 808 with multi-compatible pump functionality as well.

In any case, for the set of traits corresponding to a given engine or pump, such as traits 320a-334a, the traits may comprise numbers, equations, ranges, lookup tables, sequences, or other formulations of data or relationships pertinent to that engine. Some exemplary traits and functions relevant to gas turbine engines were discussed above. Some exemplary traits relevant to pumps and related plumbing include maximum pressure, maximum flow, battle override, etc. For the set of function calls appropriate to turbine engines, some examples were discussed above. Some exemplary function calls relevant to pumps include start, run, and the like.

Figure 13:
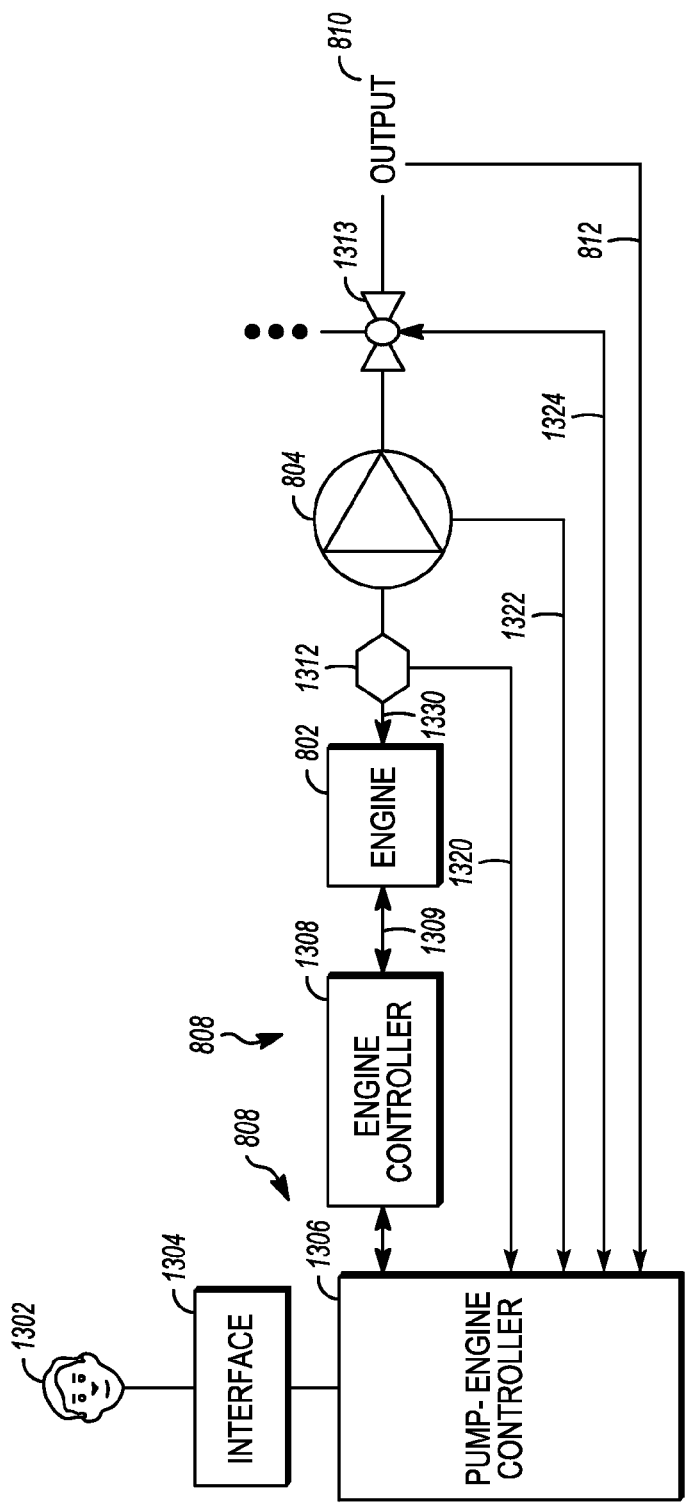
FIG. 13 is a block diagram of an exemplary application of pump-engine controller according to one embodiment of the present disclosure.

FIG. 13 illustrates a more detailed implementation of the present example. Here, the system controller 808 is implemented in the form of two controllers: an engine controller 1308 and a pump-engine controller 1306. The engine controller 1308 may comprise a multi-compatible engine controller as described above in FIGS. 7 and 12. In this case, the engine controller 1308 is compatible with multiple variants of gas turbine engine, the engine controller 1308 being programmed to receive identification of a variant of the gas turbine engine 802 and thereafter to interactively manage operation of the engine 802 accordingly.

The engine controller 1308 is coupled to the engine 802 directly via one or more links 1309. The controller 1308 is also coupled to a variety of sensors (not shown), which are associated with the engine and provide data describing engine operating characteristics as have been described above in detail. As for engine controls, these are exemplified by the traits and function calls explained above in detail.

The engine 802 provides an output 1330 that drives a pump 804 either directly or indirectly via a gearbox 1312 or other type of transmission. The sensors and/or controls (not shown) of the gearbox 1312 are coupled to the pump-engine controller 1306 via one or more links 1320. The gearbox sensors relay signals describing configuration and conditions and operating conditions of the transmission such as temperature, vibration, acoustic noise, rotational speed, clutch engagement, and the like.

Likewise, sensors and/or controls (not shown) of the pump 804 are coupled to the pump-engine controller 1306 via one or more links 1322. Optionally, output from the pump 804 may be directed to one or more valves or other plumbing features in order to condition hydraulic output of the pump 804, such as by redirecting the flow, changing flow pressure or velocity, adding substances in to the flow, etc. For the sake of illustration simplicity, the wide scope of potential plumbing features are illustrated by valve 1313. Sensors and/or controls (not shown) associated with the valve 1313 are coupled to the pump-engine controller 1306 via at least one feedback link 1324. The plumbing sensors produce and relay data describing configuration and conditions of the plumbing and pump, with some examples including valve open, valve closed, valve degree of openness, pump flow, pump pressure, pump vibration, pump heat, pump noise, temperature of pumped material into or out of the pump, pump ready, pump operating limitations, etc. Some or all of these configurations and conditions may be expressed in the traits 320a-324e associated with the pump or plumbing relevant to such traits.

Output from the valve 1313 is illustrated by 810. Conditions and/or characteristics of the output 810 are relayed to the pump-engine controller 1306 by way of one or more feedback links 812 attached to output sensors (not shown).

The pump-engine controller 1306 may be implemented in different ways, with one example being an integration of FPGA circuit, microprocessor, memory, and various I/O lines, using a custom operating system with various unique device drivers.

Figure 15:
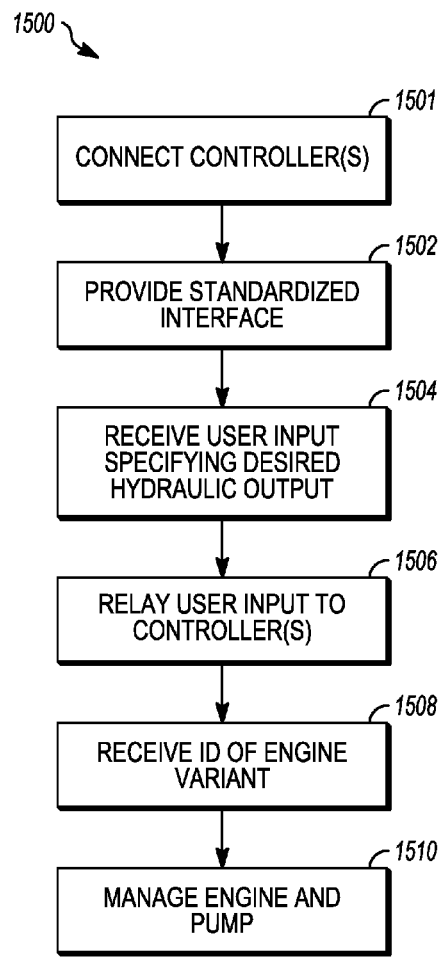

FIG. 15 shows an exemplary operating sequence 1500 for regulating hydraulic output of an engine-driven pump to meet prescribed output flow specifications despite changing loads on the pump. Computational steps of the sequence 1500 may be embodied directly in hardware, firmware, software executed by hardware, circuitry, or a combination of these. Although the steps 1500 are necessarily depicted in some order, the order may be changed, steps combined, and other changes to the sequence without departing from the scope of this disclosure.

For ease of explanation, but without any intended limitation, the example of FIG. 15 is described in the specific context of the system hardware from FIG. 13. Step 1501 couples the controller 1306 to controls and sensors of the engine 802, gearbox 1312, pump 804, valve 1313, and output 810. Numerous examples of these controls and sensors have been given above. This step may be performed manually by a technician, for example.

Step 1502 provides the interface 1304, which may be configured structured according to many examples given above. In one example, the interface 1304 is standardized, in that the display features of the interface are substantially the same regardless of the make, model, or other variant of gas turbine engine and pump being controlled. In one example of the standardized interface, user inputs may be limited to commands to set flow rate at 810, set pressure at 810, turn pump 804 on, and turn pump 804 off.

In step 1504, the interface 1304 receives input from the user 1302 specifying a desired hydraulic output at 810. As an example, the specified hydraulic output may include flow, pressure, or another fluid or semi-fluid characteristic. Advantageously, the user input may be free of any specificity as to which variant of gas turbine engine and pump are represented by 802, 804, and also free of any control or other inputs specific to the pump 804 or engine 802. And, in this sense, the interface 1304 and controller 1306 may present to the user 1302 as a black box, allowing for user input of nothing more the desired hydraulic output. This reduces demands on the user 1302 and minimizes the potential for error. In step 1506, the interface 1304 relays the desired hydraulic output to the pump-engine controller 1306.

In the case where the engine controller 1308 is multi-compatible, then in step 1508, the engine controller 1308 receives some identification of the particular variant of gas turbine engine represented by the engine 802. This may be contained in digital storage accessible by or on-board the controller 1308, input from the user 1302, pre-programmed into the controller 1308, available from a bullet (not shown) associated with the engine 802, ascertained by interrogating the engine 802, or other means. In applications where the pump-engine controller 1306 is multi-compatible as to pumps, then step 1508 also includes operations whereby the controller 1306 receives some identification of the installed pump 804's variant.

In step 1510, responsive to the user input from step 1504, and according to the engine and pump variants variant identified in step 1508, the controllers 1306, 1308 automatically regulate flow and pressure at the pump to meet the desired output flow characteristics. Advantageously, since this is achieved by automatic control, it can be efficiently accomplished despite changing loads on the pump, unlike prior systems that were manually controlled by a human operator. More particularly, to automatically regulate flow and pressure at the pump in step 1510, the controllers 1306, 1308 calculate operational input output requirements of the gas turbine engine 802 needed to meet the desired output flow characteristics, and instruct engine controls to supply the calculated input requirements to the engine 802.

In other words, the pump-engine controller 1306 computes output 1330 requirements of the engine 802 needed to provide the desired hydraulic output 810, and sends appropriate direction to the engine controller 1308. For example, the controller 1306 may calculate rotational speed and torque output for the gas turbine engine necessary to yield the prescribed hydraulic output characteristics, and transmit the calculated inputs to the engine controller 1308. In turn, the engine controller 1308 calculates input requirements such as air, fuel, and ignition specific to the variant of engine 802 in order for the engine 802 to achieve the specified output, and transmits these to the engine 802. The engine controller 1308 further uses engine feedback received from the engine sensors in computing engine control inputs to manage the engine 802.

Each of the controllers 1306, 1308 manages operation of its respective system by using stored rules and parameters corresponding to the system. These rules and parameters may be expressed, for example, in terms of the traits, function calls, or other applicable features of the architecture 300. As a more particular example, different PID control loops stored in the traits 320a-334a may be used to regulate engine output and pump output.

Without any intended limitation, the system of FIG. 13 in one example may use two PID loops. The first PID loop receives inputs including user-specified hydraulic output, measured hydraulic output, and operating limitations such as pressure and flow limits of plumbing connected to the output 810. The output of this loop includes targeted output of the engine 802, such as shaft horsepower and/or torque, and this is provided to a second PID loop. The second loop receives inputs including targeted engine output, from the first loop, as well as sensed engine conditions such as temperature, speed, and torque. The output of the second loop includes air, fuel, ignition, or other parameters to be used as combustion inputs to the engine 802.

Since the controller 1308 manages the engine 802 to achieve the engine output specified by the pump-engine controller 1306, in this respect, the controller 1308 appears as a "black box" from the perspective of the pump-engine controller.

Analogous to the engine controller 1308, the pump-engine controller 1306 is programmed to use data describing configuration and conditions of the plumbing and pump received via the various sensor inputs to manage the engine controller 1308, plumbing, and pump 804 to automatically regulate flow and pressure of pumped material to meet prescribed flow characteristics despite changing loads on the pump. Since the pump-engine controller manages the overall system to achieve the user's desired hydraulic output, in this respect, the controller 1306 functions as a "black box" from the perspective of the end user 1302.

Implementation Example #5: Array of Pump-Engine Assemblies Sharing Work

Figure 9:
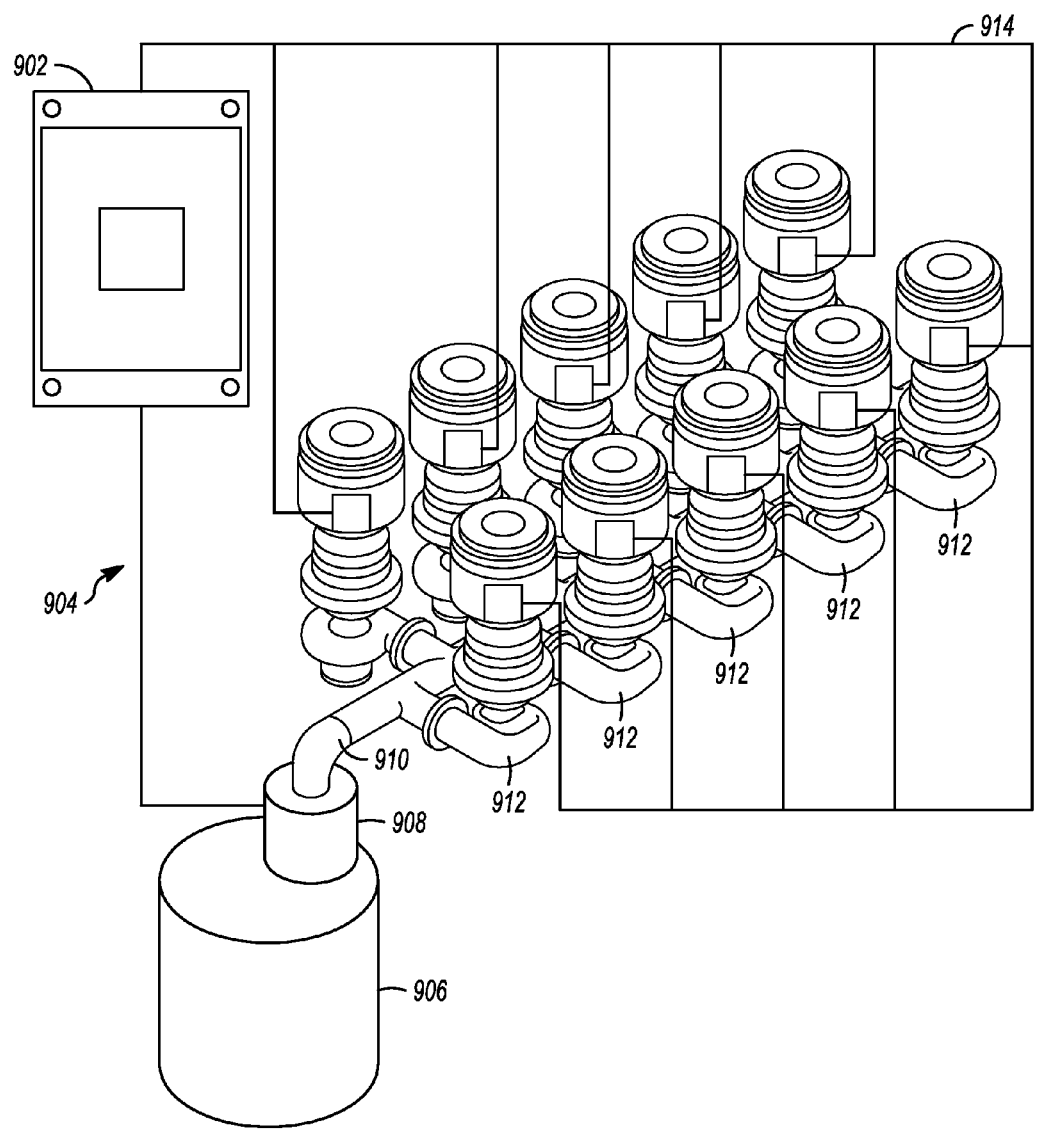
FIG. 9 is a block diagram of an exemplary equipment to simultaneously manage multiple pump-engine assemblies according to one embodiment of the present disclosure.

In a further example, the architecture of FIGS. 3-4 may be applied to the task of digitally controlling an array of pump-engine assemblies. FIG. 9 shows an overview of this system. A pump array may also be referred to as a "pump-engine array" or an array of multiple pump-engine assemblies. Each pump-engine assembly 912 of the array includes a pump and an engine such as a gas turbine engine. The engine drives its connected pump. All pumps are coupled to a common manifold 910. Without any intended limitation, the present example depicts the manifold 910 coupled to a wellhead 906.

A master controller 902 is coupled to each of the pump-engine assemblies 912 either directly or via one or more intermediate controllers. Control lines 914 couple the master controller 902 to the pump-engine assemblies 912, and at least one feedback line 904 provides data from a pressure/flow sensor 908 proximate the manifold 910 or wellhead 906. The master controller 902 and any intermediate controllers (not shown) are collectively programmed to receive user-specified hydraulic output, and in response, to automatically manage the individual pump-engine assemblies 912 to meet the user-specified hydraulic output of the manifold 910.

Figure 10:
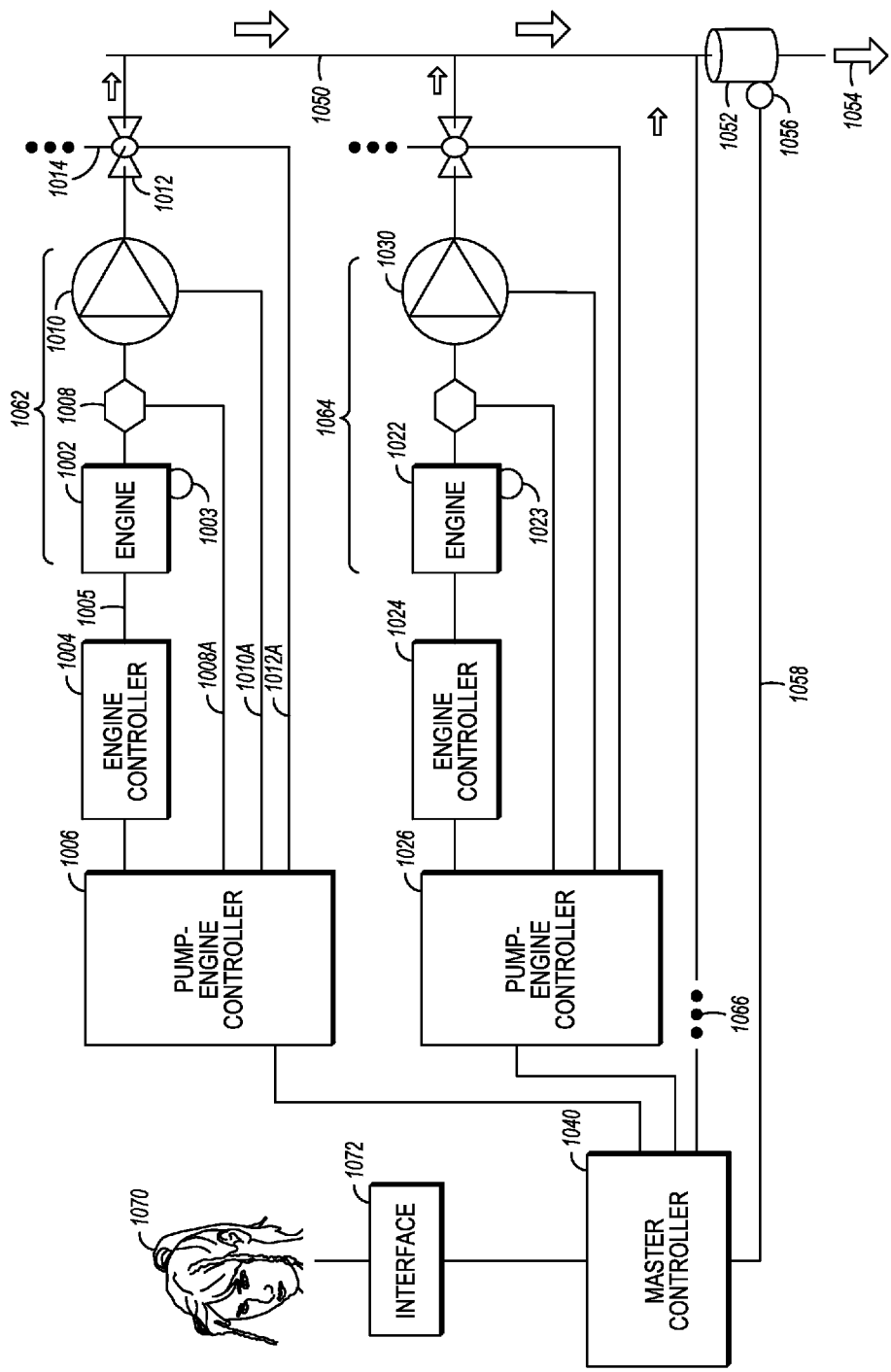
FIG. 10 is a more detailed block diagram of an exemplary equipment to simultaneously manage multiple pump-engine assemblies according to one embodiment of the present disclosure.

FIG. 10 illustrates a more detailed implementation of the present example. Here, there are multiple pump-engine assemblies, each under control of a respective pump-engine controller. Although there are two pump-engine assemblies 1062, 1064 and correspondingly two pump-engine controllers 1006, 1026 and two engine controllers 1004, 1024 in the present example, the system may use three or four or any greater number of parallel systems as indicated by reference 1066, or even a lesser number (not shown). In any case, all pump-engine controllers 1006, 1026 report to a master controller 1040. Each of the various controllers 1004, 1006, 1024, 1026 may be implemented in different ways, with various examples of controllers having been described above.

Each pump-engine assembly 1062, 1064 provides its individual hydraulic output to a common manifold 1050, which in one example, is connected to a wellhead 1052. Each of the pumps, such as 1010, 1030, are coupled to one or more reservoirs (not shown) containing one or more materials to be pumped, such as fluids, semi-fluids, etc. The materials to be pumped may comprise a mixture of materials, which may be previously mixed or mixed by the pumps under control of the pump-engine controller or master controller 1040. To interact with the master controller 1040, the user 1070 employs an interface 1072.

As an alternative to the illustrated configuration, the pumps may be divided into groups, with each group of pumps feeding into a shared pipe (not shown), and each of the different shared pipes in turn feeding into the manifold 1052. As appropriate to the application at hand, sensors may be installed at some or all of the pump outputs, shared pipes, and the manifold, in order to measure hydraulic output with any desired level of granularity.

An exemplary configuration of pump-engine assembly is now discussed in greater detail, using the example of the assembly 1062. The pump-engine assembly 1062 includes an engine 1002 driving a pump 1010. The engine controller 1004 manages the engine 1002 via a link 1005. On a hierarchically superior level, a pump-engine controller 1006 manages both the engine controller 1004, the pump 1010, and other equipment such a gearbox 1008 (or other transmission appropriate to the specific application), and various plumbing represented by the valve 1012. The pump-engine controller 1006 exchanges feedback and/or control signals with the gearbox 1008, pump 1010, and plumbing 1012 via links 1008a, 1010a, and 1012a. In the illustrated example, the valve 1012 includes at least one supplementary input 1014, additional to the input from the pump 1010, to provide for the selective addition of chemicals, fluids, semi-fluids, or other additives into the output of the pump 1010. As an alternative or additional feature, the manifold 1050 may include one or more valves (not shown) under selective control of the master controller 1040, for the purpose of introducing additives into the manifold. Relatedly, the operation of mixing-in chemicals may be expressed in terms of one or more of the function calls 320-334 related to one or more valves expressed as objects of the architecture. The plumbing 1012 may further include one or more valves to selectively connect and disconnect the pump 1010 from the manifold 1050.

The master controller 1040 is coupled to a sensor 1056 that measures hydraulic output at the manifold 1050 or a site having a fixed relationship to the manifold so that manifold output can be calculated. Signals from the sensor 1056 travel to the master controller 1040 via one or more links 1058. In the application where the pump-engine assemblies are employed to pump fluids into a wellhead, the sensor 1056 may be situated proximate the manifold 1050 itself, downstream of the manifold 1050 at the wellhead 1052, downstream 1054 of the wellhead 1052 at a site such as a drilling casing, or another site appropriate to the specific application. The example shown in FIG. 10 illustrates the sensor 1056 at the wellhead 1052.

The master controller 1040 is programmed to receive input from the user 1070, such input including desired hydraulic output, and in response, to automatically manage the individual pump-engine assemblies 1062, 1064, 1066 to supply the desired hydraulic output at the manifold 1050. This is performed responsive to user input free of any details of engine and pump configuration and operation, and free of any user specified control inputs to the engines and pumps. In this sense, the interface 1072 and master controller 1040 present to the user 1070 as black box, reducing demands on the user 1070 and also reducing the potential for error.

The pump-engine controllers and engine controllers may use the same configuration and operational principles as the pump-engine controller and engine controller discussed above, for example in FIGS. 13 and 15. For example, some or all features may be carried over from the foregoing description, such as the feature of multi-compatibility among engines and plumbing, computation of operating requirements of gas turbine engines to meet stated flow requirements, use of architecture 300 including objects 304-312 and functions and traits, etc. As for multi-compatibility, FIG. 10 illustrates exemplary but optional bullets 1003, 1023 on the engines 1002, 1022.

Figure 16:
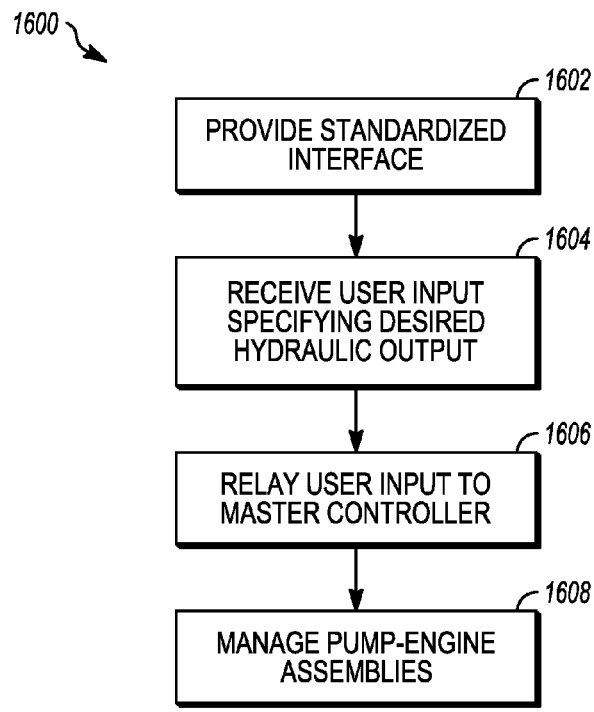

FIG. 16 shows an exemplary operating sequence 1600 for concurrently managing multiple pump-engine assemblies to achieve shared work. Computational steps of the sequence 1600 may be embodied directly in hardware, firmware, software executed by hardware, circuitry, or a combination of these. Although the steps 1600 are necessarily depicted in some order, the order may be changed, steps combined, and other changes to the sequence without departing from the scope of this disclosure.

For ease of explanation, but without any intended limitation, the example of FIG. 16 is described in the specific context of the system hardware from FIG. 10. Step 1602 provides the interface 1072, which may be structured according to many examples given above. In one example, the interface 1072 is standardized, in that the display features of the interface are substantially the same regardless of the make, model, or other variant of gas turbine engines and pumps being controlled. The step of interconnecting the components of FIG. 10 is not shown in the sequence 1600, however the nature, order, and integration of the interconnecting step(s) relative to the steps 1602 will be apparent to those of ordinary skill having the benefit of this disclosure.

In step 1604, the interface 1072 receives input from the user 1070 specifying a desired hydraulic output to be achieved at the sensor 1056 in this example. The user submitted hydraulic output may specify flow, pressure, another fluid or semi-fluid characteristic, or a combination of these. Advantageously, the user input may be free of any specificity as to which variant of gas turbine engine and pump are found in the pump-engine assemblies 1062, 1064. And, in this sense, the interface 1072 and master controller 1040 present to the user 1070 as black box, allowing for greater scope of input but accepting user input of nothing more the desired hydraulic output. This reduces demands on the user 1070 and minimizes the potential for error. In step 1606, the interface 1072 relays the user-specified hydraulic output to the master controller 1040.

In the case where any of the engine controllers 1004, 1024 and/or pump-engine-controllers 1006, 1026 are multi-compatible, then the sequence 1600 includes the operation (not shown) of receiving identification of the particular variant of installed gas turbine engine and/or pump. This operation may be carried out as discussed in detail above, and integrated into the sequence 1600 as appropriate.

In step 1608, responsive to the user input from step 1604, and according to any engine and pump variants variant identified as discussed above, the master controller 1040 automatically manages the individual pump-engine assemblies 1062, 1064 to supply the desired hydraulic output measured at 1054. Specifically, the master controller 1040 individually directs each pump-engine controller 1006, 1026 to manage its corresponding pump-engine assembly to provide a target individual hydraulic output. The master controller 1040 calculates the individual target hydraulic outputs of the pump-engine assemblies so that they collectively achieve the desired overall hydraulic output 1054 in satisfaction of the user specified input.

In turn, each pump-engine controller 1006, 1026 calculates a target engine output needed to meet the master controller's target hydraulic output, and directs its engine controller to adjust engine output until the driven pump achieves the targeted hydraulic output specified by the master controller 1040.

In turn, each engine controller 1004, 1024 calculates control inputs needed to achieve the target engine output and then directs its engine controls to provide these combustion inputs to the engine. The foregoing control operations may be achieved in the same way as steps 1410 and 1510 discussed in detail above, in the context of FIGS. 12-13 and 14-15. Advantageously, since the foregoing operations are carried out by automatic control, they can be efficiently accomplished despite changing loads on the pump, and differences in the engines and pumps, unlike prior systems that necessitated manual control by a human operator.

The prescribed overall strategy of the master controller 1040 may include a number of further features. As one possible feature, the master controller 1040 may be programmed to avoid backflow through the pump-engine assemblies by (1) ensuring that all pump-engine assemblies whose maximum hydraulic output is less than the desired hydraulic output are turned off or remain off or disconnected from the manifold 1050, and/or by (2) ensuring that all pump-engine assemblies whose minimum hydraulic output exceeds the desired hydraulic flow are turned off or remain off or disconnected from the manifold 1050. As another feature, the master controller 1040 may be programmed to avoid running any particular gas turbine engine at a prescribed percentage of the particular gas turbine engine's maximum power. In one example, these and other features may be implemented by establishing rules of a predetermined resource allocation strategy, where many such strategies will be apparent to ordinarily skilled artisans having the benefit of this disclosure.

Without any intended limitation, one example of the system of FIG. 10 may use three levels of PID loop. The first-level PID loop receives inputs including user-specified overall hydraulic output of the system, measured hydraulic output of the system, and operating limitations such as pressure and flow limits of the manifold 1052, wellhead, and other plumbing. The output of this loop includes individual targeted hydraulic outputs for each of the pumps 1010, 1030. There is a second-level PID loop for each pump-engine combination, where each of these loops receives inputs including the targeted hydraulic outputs for that particular pump (from the first-level loop), measured hydraulic output of that pump, and operating limitations such as pressure and flow limits of plumbing connected to the pump. The output of each second-level loop includes targeted shaft horsepower or torque or other output measure of the related engine, and each such output is provided to a third-level PID loop. Each of the third-level loops loop receives inputs including targeted engine output from the corresponding second-level loop, as well as sensed engine conditions such as temperature, speed, and torque. The output of the third-level loop includes air, fuel, ignition, or other parameters to be used as combustion inputs to the engine 802.

Storage and Data Processing Components

A. Introduction

The foregoing figures and text contain various data processing components, such as the processor 340, controllers 616, 710, 808, 902, 1040, 1004, 1006, 1024, 1026, 1306, 1308, and the like. Furthermore, other components of the illustrated systems may include smart features, and in this respect, include some data processing features. Some examples include the platform applications 414, abstraction layer 418, capabilities 416, objects 402-406 and 408-412, abstraction layer 438, and the like.

In any or all of the foregoing instances, such data processing features may be implemented by one or more hardware devices, software devices, a portion of one or more hardware or software devices, or a combination of the foregoing. The makeup of these subcomponents is described in greater detail below, with reference to FIGS. 17-19.

B. Exemplary Digital Data Processing Apparatus

Figure 17:
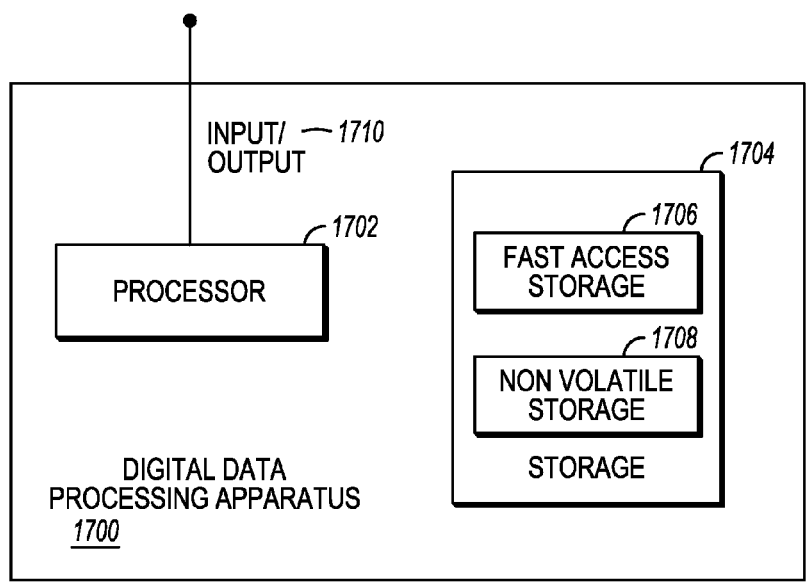
FIG. 17 is a block diagram of an exemplary digital data processing machine according to one embodiment of the present disclosure.
Figure 18:
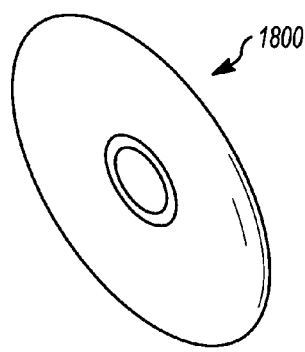
FIG. 18 is a perspective diagram of an exemplary digital data storage medium according to one embodiment of the present disclosure.

As mentioned above, the data processing entities of the disclosure may be implemented by various processing engines. FIG. 17 shows one example, in the form of a digital data processing apparatus 1700. The apparatus 1700 may be implemented by a personal computer, custom circuit board, workstation, notebook computer, controller, microcontroller, state machine, or other processing machine appropriate to the requirements of the tasks explained herein. The apparatus 1700 includes a processor 1702, such as a microprocessor, controller, microcontroller, digital signal processor (DSP), application specific integrated circuit (ASIC), field programmable gate array (FPGA) or other programmable logic device, discrete gate or transistor logic, discrete hardware components, or any combination thereof designed to perform the functions described herein. The processor 1702 may also be implemented as a combination of computing devices, such as a combination of a DSP and a microprocessor, a plurality of microprocessors, one or more microprocessors in conjunction with a DSP core, or any other such configuration.

The processor is coupled to digital data storage 1704. In the present example, the storage 1704 includes a fast-access storage 1706, as well as nonvolatile storage 1708. The fast-access storage 1706 may be used, for example, to store the programming instructions executed by the processor 1702. The storage 1706 and 1708 may be implemented by various devices, such as those discussed in greater detail herein. Many alternatives are possible. For instance, one of the components 1706, 1708 may be eliminated; furthermore, the storage 1704, 1706, and/or 1708 may be provided on-board the processor 1702, or even provided externally to the apparatus 1700.

The apparatus 1700 also includes an input/output 1710, such as a connector, line, bus, cable, buffer, electromagnetic link, network, modem, transducer, IR port, antenna, or other means for the processor 1702 to exchange data with other hardware external to the apparatus 1700.

C. Storage Media

As mentioned above, instances of digital data storage may be used, for example, to provide storage used by various of the presently disclosed systems, to embody the storage 1704 and 1708 (FIG. 17), and for other purposes as well. Depending upon its application, this digital data storage may be used for various functions, such as storing data, or to store machine-readable instructions. These instructions may themselves aid in carrying out various processing functions, or they may serve to install a software program upon a computer, where such software program is then executable to perform other functions related to this disclosure.

In any case, the storage media may be implemented by nearly any mechanism to digitally store machine-readable signals. One example is optical storage such as CD-ROM, WORM, DVD, digital optical tape, disk storage 1800 (FIG. 18), or other optical storage. Another example is direct access storage, such as a conventional "hard drive", redundant array of inexpensive disks ("RAID"), or another direct access storage device ("DASD"). Another example is serial-access storage such as magnetic or optical tape. Still other examples of digital data storage include electronic memory such as ROM, EPROM, flash PROM, EEPROM, memory registers, battery backed-up RAM, etc.

An exemplary storage medium is coupled to a processor so the processor can read information from, and write information to, the storage medium. In the alternative, the storage medium may be integral to the processor. In another example, the processor and the storage medium may reside in an ASIC or other integrated circuit.

D. Logic Circuitry

Figure 19:
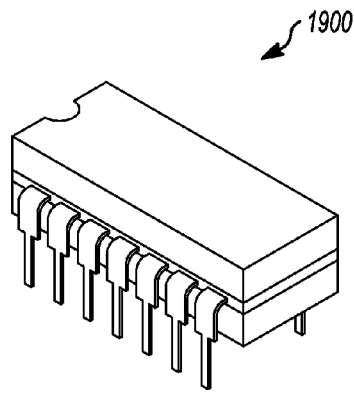
FIG. 19 shows an example of logic circuitry in the form of an integrated circuit according to one embodiment of the present disclosure.
Figure 20:
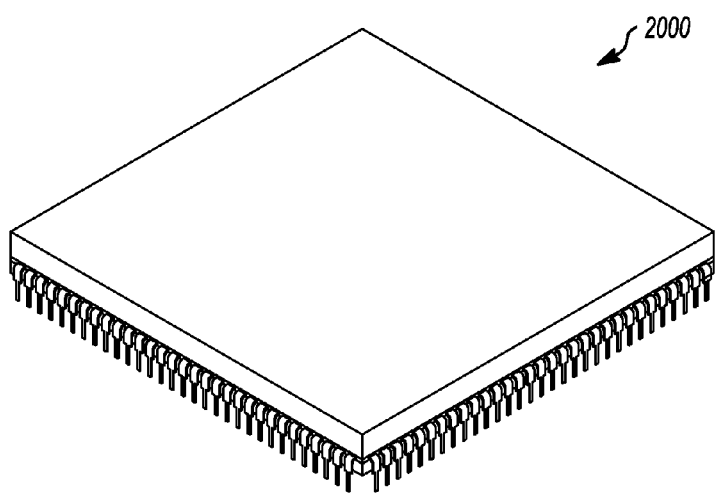
FIG. 20 shows an example of logic circuitry in the form of a field programmable gate array according to one aspect of the present disclosure.

In contrast to storage media that contain machine-executable instructions, as described above, a different embodiment uses logic circuitry to implement digital data processing or other smart features of the present disclosure. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like. FIG. 19 shows an example of logic circuitry in the form of an integrated circuit 1900. FIG. 20 shows an example of logic circuitry in the form of an FPGA 2000.

Other Embodiments

While the foregoing disclosure shows a number of illustrative embodiments, it will be apparent to those skilled in the art that various changes and modifications can be made herein without departing from the scope of the invention as defined by the appended claims. Accordingly, the disclosed embodiment are representative of the subject matter which is broadly contemplated by the present invention, and the scope of the present invention fully encompasses other embodiments which may become obvious to those skilled in the art, and that the scope of the present invention is accordingly to be limited by nothing other than the appended claims.

All structural and functional equivalents to the elements of the above-described embodiments that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 USC 112, sixth paragraph, unless the element is expressly recited using the phrase "means for" or, in the case of a method claim, the phrase "step for."

Furthermore, although elements of the invention may be described or claimed in the singular, reference to an element in the singular is not intended to mean "one and only one" unless explicitly so stated, but shall mean "one or more". Additionally, ordinarily skilled artisans will recognize that operational sequences must be set forth in some specific order for the purpose of explanation and claiming, but the present invention contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

This specification has been set forth with various headings and subheadings. These are included to enhance readability and ease the process of finding and referencing material in the specification. These heading and subheadings are not intended, and should not be used, to affect the interpretation of the claims or limit claim scope in any way.

The invention claimed is:

1. An engine control system for use in hydraulic fractional operations comprising:
digital data storage containing predetermined operational rules and parameters corresponding to multiple variants of gas turbine engine; and
a digital engine controller coupled to the storage and programmed to perform operations comprising:
receiving identification of a variant of target gas turbine engine coupled to the engine control system; and
managing operation of the target gas turbine engine utilizing predetermined rules and parameters stored in the digital data storage and corresponding to the identified variant of gas turbine engine.

2. The system of claim 1, the rules and parameters including at least one proportional-integral-differential control loop for each engine variant.

3. The system of claim 2, the controller further programmed to perform operations including modifying one or more of the proportional-integral-differential control loops responsive to user input.

4. The system of claim 1, the receiving operation comprising receiving user input identifying the variant of target gas turbine engine.

5. The system of claim 1, the receiving operation comprising automatically detecting the variant of the target gas turbine engine.

6. The system of claim 1, where:
the rules and parameters include at least one proportional-integral-differential control loop for each variant; and
the digital engine controller is further programmed to perform operations including automatically detecting properties of the target engine and based on the detected properties and in response automatically matching stored proportional-integral differential control loop parameters to specific requirements of the coupled engine.

7. The system of claim 1, further comprising:
multiple sensors coupled to the target gas turbine engine;
control lines coupling the digital engine controller to controls of the target gas turbine engine; and
feedback lines coupling the digital engine controller to the sensors.

8. The system of claim 1, further comprising an operator interface coupled to the digital engine controller, the operator interface providing a substantially standardized interface regardless of the variant of gas turbine engine being controlled.

9. An engine control system, comprising:
digital data storage tangibly embodying operational rules and parameters corresponding to multiple variants of gas turbine engine; and
a digital engine controller coupled to the storage and programmed to perform operations comprising:
receiving identification of a variant of gas turbine engine coupled to the digital controller;
responsive to said receiving operation, performing operations comprising employing the operational rules and parameters to calculate engine control inputs compatible with the identified variant, and applying the calculated engine control inputs to the gas turbine engine to produce a user-specified engine output.

10. An engine control system, comprising:
digital data storage tangibly embodying operational rules and parameters corresponding to multiple variants of gas turbine engine; and
a digital engine controller coupled to the storage and programmed to perform operations comprising:
receiving identification of a variant of gas turbine engine coupled to the digital controller;
receiving user-specified output of the engine; and
applying the operational rules and parameters to automatically determine and adjust inputs to the engine according to the received identification of engine variant to regulate engine output to meet the user-specified output.

11. A method of controlling a gas turbine engine, comprising operations of:
digitally storing operational rules and parameters corresponding to multiple variants of gas turbine engine;
providing a substantially standardized user interface for use across multiple variants of gas turbine engine;
at the interface, receiving user input specifying a desired output of a gas turbine engine attached to the interface via an engine controller, the user input being free of specificity as to which variant of gas turbine engine is represented by the attached gas turbine engine; and
the interface relaying the user input to the engine controller, and in response to receiving the user input, the engine controller retrieving rules and parameters corresponding to the subject gas turbine engine from storage and using the retrieved rules and parameters to manage operation of the attached gas turbine engine to achieve the desired engine output.

12. The method of claim 11, the rules and parameters including at least one proportional-integral-differential control loop for each engine variant.

13. The method of claim 12, further comprising the controller modifying one or more of the proportional-integral-differential control loops responsive to user input.

14. The method of claim 11, the receiving operation comprising receiving user input identifying the variant of target gas turbine engine.

15. The method of claim 11, the receiving operation comprising automatically detecting the variant of the target gas turbine engine.

* * * * *